US008511836B2

(12) United States Patent
Usuda et al.

(10) Patent No.: US 8,511,836 B2
(45) Date of Patent: Aug. 20, 2013

(54) DIAPHRAGM APPARATUS FOR PROJECTORS

(75) Inventors: Yuichirou Usuda, Saitama (JP);
Shigemi Takahashi, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 266 days.

(21) Appl. No.: 13/121,789

(22) PCT Filed: Sep. 29, 2009

(86) PCT No.: PCT/JP2009/066929
§ 371 (c)(1),
(2), (4) Date: May 26, 2011

(87) PCT Pub. No.: WO2010/038731
PCT Pub. Date: Apr. 8, 2010

(65) Prior Publication Data
US 2011/0222026 A1      Sep. 15, 2011

(30) Foreign Application Priority Data

Sep. 30, 2008  (JP) .................................. 2008-255368
Oct. 31, 2008  (JP) .................................. 2008-282232
Aug. 31, 2009  (JP) .................................. 2009-199933

(51) Int. Cl.
*G03B 21/14*        (2006.01)
(52) U.S. Cl.
USPC .................... 353/97; 353/88; 353/98; 353/99; 353/119; 349/7; 396/505
(58) Field of Classification Search
USPC .............. 353/30, 31, 38, 88, 69, 94, 97–99, 353/119; 359/487, 495, 497, 250, 253, 622, 359/627, 634; 396/505, 507, 502, 508, 501, 396/164; 349/5, 7–9
See application file for complete search history.

(56) References Cited

U.S. PATENT DOCUMENTS 7,068,929 B2 *   6/2006   Nomura ........................... 396/73
7,210,795 B2 *   5/2007   Hara et al ........................ 353/88
(Continued)

FOREIGN PATENT DOCUMENTS

JP        8-227102        9/1996
JP        2004-69966      3/2004
(Continued)

OTHER PUBLICATIONS

International Search Report issued Nov. 24, 2009 in International (PCT) Application No. PCT/JP2009/066929.

*Primary Examiner* — Georgia Y Epps
*Assistant Examiner* — Sultan Chowdhury
(74) *Attorney, Agent, or Firm* — Wenderoth, Lind & Ponack, L.L.P.

(57) ABSTRACT

When a rotation member is rotated clockwise by a stepping motor, one main operation member is rotated counterclockwise through a link member and the other main operation member is rotated clockwise by said main operation member through the link member. Also, one sub operation member is rotated counterclockwise by said main operation member through the link member, and the other sub operation member is rotated clockwise by the other main operation member through the link member. This causes the amount of overlap between a main split blade mounted to said main operation member and a sub split blade mounted to said sub operation member to be increased and also causes the amount of overlap between a main split blade mounted to the other main operation member and a sub split blade mounted to the other sub operation member to be also increased. As a result, the aperture opening formed between the two main split blades is increased.

20 Claims, 26 Drawing Sheets

(56) References Cited

U.S. PATENT DOCUMENTS

| | | | |
|---|---|---|---|
| 7,677,740 B2 * | 3/2010 | Takeuchi et al. | 353/97 |
| 7,726,819 B2 * | 6/2010 | Shouji | 353/97 |
| 7,798,653 B2 * | 9/2010 | Inui et al. | 353/97 |
| 2003/0202791 A1 * | 10/2003 | Sato et al. | 396/505 |
| 2005/0264770 A1 * | 12/2005 | Hara et al. | 353/97 |
| 2006/0050249 A1 | 3/2006 | Hashimoto et al. | |
| 2008/0043208 A1 * | 2/2008 | Chang | 353/88 |
| 2009/0174869 A1 | 7/2009 | Inui et al. | |
| 2010/0238419 A1 * | 9/2010 | Mochizuki | 353/97 |
| 2012/0013858 A1 * | 1/2012 | Fukunaga et al. | 353/97 |

FOREIGN PATENT DOCUMENTS

| | | |
|---|---|---|
| JP | 2005-157162 | 6/2005 |
| JP | 2006-78787 | 3/2006 |
| JP | 2006-343512 | 12/2006 |
| JP | 2007-47337 | 2/2007 |

* cited by examiner

DIAPHRAGM APPARATUS FOR PROJECTORS

TECHNICAL FIELD

The present invention relates to a diaphragm apparatus for light from a light source which is suitable in the use of projectors which project images or letters on a screen.

BACKGROUND TECHNIQUE

In recent years, projectors provided with a liquid crystal panel, DMD (Digital Micro Miller Device) or the like have appeared. They are being used in such presentation as various announcement meetings, business or the like, and further, are adopted also as the instrument for home theaters. And Japanese Unexamined Patent Application Publication No. 2004-69966 describes a projector, as the projector of this kind, in which the illuminating light amount from a light source (lamp) is changed in accordance with the brightness in a projection room or in which the cross sectional area of the light path is changed by a diaphragm device arranged in the vicinity of the light source lamp to adjust the illuminating light amount without changing a light amount itself emitted from the light source lamp, in order to temporarily weaken during no projection.

Further, Japanese Unexamined Patent Application Publication No. 2006-343512 describes a diaphragm apparatus for projectors in which the light path of the light from the light source can be intercepted during no projection, and further describes that it becomes possible to prevent the liquid crystal from deteriorating if the illuminating light is even temporarily weakened or intercepted during no projection by the diaphragm apparatus when such diaphragm is adopted in the liquid crystal projector.

Further, Japanese Unexamined Patent Application Publication No. 2004-69966 and No. 2006-343512 also describe that it becomes possible to obtain a high contrast image on the screen if such a diaphragm apparatus is provided in the projector and the amount of the illuminating light is decreased in the scene of a dark projected image and is increased in the scene of a bright projected image.

Furthermore, Japanese Unexamined Patent Application Publication No. Hei 8-227102 describes that in case of an over-head projector in which the projecting optical system is formed as a varifocal optical system, it becomes possible to preferably obtain a projected image at high magnification if a diaphragm apparatus is arranged between a stage for putting a copy paper thereon and a light source. Further, Japanese Unexamined Patent Application Publication No. 2005-157162 describes a diaphragm apparatus in which a light intercepting blade (which is also named as light intercepting plate, diaphragm plate, or the like) is adapted to be moved on a plane perpendicular to the light path, like the diaphragm apparatus described in Japanese Unexamined Patent Application Publication No. Hei 8-227102. However, in case of this diaphragm apparatus, the respective light intercepting blade is adapted to be formed by each two divided blades to make the space for housing two light intercepting blades small when the light path is fully opened.

Besides, the diaphragm apparatus described in Japanese Unexamined Patent Application Publication No. 2004-69966, Japanese Unexamined Patent Application Publication No. 2006-343512, Japanese Unexamined Patent Application Publication No. hei-8-227102 and Japanese Unexamined Patent Application Publication No. 2005-157162 are adapted to change the area of light path by reciprocating two light intercepting blades in the opposing directions at the same time. Therefore, the center of the light path results in existing always within the light path if the light path is not completely intercepted. However, it is also known that there is a case in which one light intercepting blade is adapted to move from one lateral position to the other lateral position of the light path over a center thereof, in order to form the smallest light path or to intercept completely the light path at the other lateral position.

DISCLOSURE OF INVENTION

By the way, in the case of the diaphragm apparatus for light source light, the distribution of light from the light source may be affected when the light from the light source is reflected to the light source side by the light intercepting blade. Therefore, it is favorable to be reflected out of the light path as much as possible the light reflected by the light intercepting blade. It is also possible to control rise of temperature near the diaphragm apparatus by doing so. Because of such reason, the diaphragm apparatuses disclosed in Japanese Unexamined Patent Application Publication No. 2004-69966 and Japanese Unexamined Patent Application Publication No. 2006-343512 are formed so that the intercepting blade does not move on a plane perpendicular to the light path but moves along a circular track. The present invention relates to a diaphragm apparatus for so formed projectors.

Recent projectors are promoted to be small sized to keep good portability. Therefore, the miniaturization is strongly required also in the case of such diaphragm apparatus as disclosed in Japanese Unexamined Patent Application Publication Nos. 2004-69966 and 2006-343512. Accordingly, even in the case of the diaphragm apparatus provided with only one intercepting blade or two intercepting blades, the most effective method is to form each intercepting blade with two divided blades in order to make small the space for housing the intercepting blade at fully opened state of the light path, as described in Japanese Unexamined Patent Application Publication No. 2005-157162.

However, the miniaturization is strongly required also in the diaphragm apparatus of such type as disclosed in Japanese Unexamined Patent Application Publication Nos. 2004-69966 and 2006-343512. One of the most effective method for satisfying this requirement is to make the space for housing the intercepting blade small in the fully opened state of the light path, by forming each intercepting blade with two divided blades, as described in Japanese Unexamined Patent Application Publication No. 2005-157162. However, in the case of the diaphragm apparatus in which the intercepting blade moves along a circular track so that the distance between the intercepting blade and the light source varies, as described in Japanese Unexamined Patent Application Publication Nos. 2004-69966 and 2006-343512, such diaphragm apparatus in which the intercepting blade is moved on a plane perpendicular to the light path, as described in Japanese Unexamined Patent Application Publication No. 2005-157162 can not be adopted as it is.

The present invention is performed to solve this problem. The object of the present invention is to provide a diaphragm apparatus for projectors that allows the mechanism to function the blades to be configured to be compact in a diaphragm apparatus in which the intercepting blade moves along a circular track so that the distance between the intercepting blade and the light source varies in the light path of the light from the light source, even if a single conventionally large intercepting blade is configured to be two small divided blades.

In order to achieve the above described object, the diaphragm apparatus for projectors of the present invention is provided with a base plate which is arranged on a lateral position of a light path of light from a light source with one surface facing to the light path, a main shaft which is vertically arranged on one of the surfaces of the base plate, a sub shaft which is vertically arranged on the plane where the main shaft is vertically arranged at a position off the imaginary line which passes through the vertically arranged position of the main shaft and which is parallel to the centerline of the light path, a main operation member rotatably installed to the main shaft, a main divided blade integrated with the main operation member, the main divided blade moving along a circular track centered at the main shaft and reciprocally moving in the light path, a sub operation member rotatably installed to the sub shaft, a sub divided blade integrated with the sub operation member, the sub divided blade moving along a circular track centered at the sub shaft and reciprocally moving in the light path, and a link member, a first end of which is rotatably installed to the main operation member and a second end of which is rotatably installed to the sub operation member, the distance from the sub shaft to the second end of the link member being longer than the distance from the main shaft to the first end of the link member, wherein the main operation member and the sub operation member are configured to be rotated in the same direction by an electromagnetic actuator such that the superposed area of the main divided blade and the sub divided blade varies.

In that case, it is preferable that the main operation member is configured to have a gear portion which is engaged with a gear rotated by the electromagnetic actuator. The diaphragm apparatus for projectors may include a rotation member that is rotatably mounted to the base plate and is reciprocally rotated within a predetermined angle coordinating with the rotation of the electromagnetic actuator, and a link member, a first end of which is rotatably installed to the rotation member and a second end of which is rotatably installed to the main operation member, the main operation member being reciprocally rotated by the reciprocal rotation of the rotation member within a predetermined angle.

It is preferable that, in the case of the diaphragm apparatus for projectors according to the present invention, the main operation member and the sub operation member are made of synthetic resin, the main divided blade and the sub divided blade are made of metal and the main divided blade and the sub divided blade are secured respectively to the main operation member and the sub operation member. Also, in the case of the diaphragm apparatus for projectors according to the present invention, the main shaft and the sub shaft may be configured to be vertically arranged on the base plate not to lie on the same line that is at right angles to the light path. Further, in the case of the diaphragm apparatus for projectors according to the present invention, when the superposed area of the main divided blade and the sub divided blade is decreased to the minimum, the light path may be configured to be intercepted by the divided blades.

In order to achieve the above described purpose, a diaphragm apparatus for projectors according to the present invention is configured to be provided with a base plate arranged on a lateral position of a light path of light from a light source with one surface facing toward the light path, a first main shaft and a second main shaft vertically arranged on one of the surfaces of the base plate at positions that are substantially equally spaced from an imaginary line on both sides of thereof which is parallel and closest to the center axis of the light path, a first sub shaft and a second sub shaft vertically arranged at positions that are substantially equally spaced from an imaginary line on both sides thereof, the distances from the imaginary line to each of the sub shafts being longer than the distances from the imaginary line to each of the main shafts, the sub shafts being located on a plane in which the two main shafts are vertically arranged, a first main operation member and a second main operation member rotatably installed to the first main shaft and the second main shaft respectively, the main operation members being reciprocally reversely rotated simultaneously in the opposing directions by driving means, a first main divided blade and a second main divided blade integrated with the first main operation member and the second main operation member respectively, the first main divided blade and the second main divided blade moving along a circular track centered at the first main shaft and the second main shaft and reciprocally moving in the light path, a first sub operation member and a second sub operation member rotatably installed to the first sub shaft and the second sub shaft, a first sub divided blade and a second sub divided blade integrated with the first sub operation member and the second sub operation member respectively, the first sub divided blade and the second sub divided blade moving along a circular track centered at the first sub shaft and the second sub shaft and reciprocally moving in the light path, and a first link member and a second link member, first ends of the first and second link members being rotatably installed to the first main operation member and the second main operation member, and second ends of the first and second link members being rotatably installed to the first sub operation member and the second sub operation member, the distances from the first sub shaft and the second sub shaft to the second ends of the first and second link members being longer than the distances from the first main shaft and the second main shaft to each of the first ends of the first and second link members, wherein the first sub operation member is configured to vary the superposed area of the first sub divided blade and the first main divided blade by being rotated in the same direction by the reciprocal rotation of the first main operation member, and the second sub operation member is configured to vary the superposed area of the second sub divided blade and the second main divided blade by being rotated in the same direction by the reciprocal rotation of the second main operation member.

In that case, the diaphragm apparatus for projectors will have advantages in manufacturing and durability in which the first main operation member, the first sub operation member, the second main operation member and the second sub operation member are made of synthetic resin, the first main divided blade, the first sub divided blade, the second main divided blade and the second sub divided blade are made of metal, the first main divided blade, the first sub divided blade, the second main divided blade and the second sub divided blade are secured to the first main operation member, the first sub operation member, the second main operation member and the second sub operation member respectively.

The diaphragm apparatus for projectors may be configured such that the first main shaft and the first sub shaft are vertically arranged on the base plate not to lie on the same line that is at right angles to the light path, the second main shaft and the second sub shaft are vertically arranged on the base plate not to lie on the same line that is at right angles to the light path, and the first sub shaft and the second sub shaft are vertically arranged at positions in the same direction along the light path with regard to the first main shaft and the second main shaft. In that case, it is preferable that the distance on the first main operation member between the position to which the first main shaft is installed and the first main divided blade is the same as the distance on the second main operation member between the position to which the second main shaft is installed and the second main divided blade, and the distance on the first sub operation member between the position to which the first sub shaft is installed and the first sub divided blade is the same as the distance on the second sub operation member between the position to which the second sub shaft is installed and the second sub divided blade.

In addition, the diaphragm apparatus for projectors may be configured such that the distance on the first main operation member between the position to which the first main shaft is installed and the mounting position of the first link member is the same as the distance on the second main operation member between the position to which the second main shaft is installed and the mounting position of the second link member, the distance on the first sub operation member between the position to which the first sub shaft is installed and the mounting position of the first link member is the same as the distance on the second sub operation member between the position to which the second sub shaft is installed and the mounting position of the second link member, and further, the distance on the first link member between the position to which the first main operation member is installed and the mounting position of the first sub operation member is the same as the distance on the second link member between the position to which the second main operation member is installed and the mounting position of the second sub operation member.

The diaphragm apparatus for projectors may be configured such that a gear portion is formed at the first main operation member, a gear portion engaging with the gear portion is formed at the second main operation member, the driving means is a single electromagnetic actuator, and when one of the first main operation member and the second operation member is reciprocally rotated by the electromagnetic actuator, the two main operation members are rotated in the opposing directions.

In addition, the diaphragm apparatus for projectors may be configured such that a third link member is provided whose ends are rotatably installed to the first main operation member and the second main operation member, the driving means is a single electromagnetic actuator, and when one of the first main operation member and the second main operation member is reciprocally rotated by the electromagnetic actuator, the two main operation members are rotated in the opposing directions. In that case, it is preferable that the distance on the first main operation member between the position to which the first main shaft is installed and the mounting position of the third link member is the same as the distance on the second main operation member between the position to which the second main shaft is installed and the mounting position of the third link member.

In addition, the diaphragm apparatus for projectors may be configured such that a gear portion engaged with a gear that is rotated by the electromagnetic actuator is formed on one of the first main operation member and the second main operation member. Or a rotation member and a main link member may be provided. The rotation member is rotatably mounted to the base plate and is reciprocally rotated coordinating with the rotation of the electromagnetic actuator within a predetermined angle. A first end of the main link member is rotatably installed to the rotation member and a second end of the main link member is rotatably installed to the first main operation member, and the first main operation member is reciprocally rotated by the reciprocal rotation of the rotation member.

The diaphragm apparatus for projectors may be configured such that the driving means are two electromagnetic actuators that are simultaneously and reciprocally rotated in the opposing directions in synchronization with each other, and the first main operation member and the second main operation member are reciprocally rotated in the opposing directions simultaneously by the electromagnetic actuator.

The diaphragm apparatus for projectors may be such that the first sub divided blade and the second sub divided blade are configured such that an area having a predetermined width along the end edge in the direction retreating from the light path is not superposed with each of the main divided blades and the area is formed by being bended to the sides of each of the main divided blades.

The diaphragm apparatus for projectors may be configured such that when the superposed area of the first main divided blade and the first sub divided blade are decreased to a minimum and the superposed area of the second main divided blade and the second sub divided blade are decreased to a minimum, the light path is intercepted by the four divided blades. Or the diaphragm apparatus for projectors may be configured such that when the superposed area of the first main divided blade and the first sub divided blade are decreased to a minimum and the superposed area of the second main divided blade and the second sub divided blade are decreased to a minimum, a small light path surrounding the center of the light path is formed by the cut portion formed in the first main divided blade and the cut portion formed in the second main divided blade.

The present invention has the following characteristic: In a diaphragm apparatus in which the intercepting blade moves along a circular track so that the distance between the intercepting blade and the light source varies in the light path of light from the light source, even if a single conventionally large intercepting blade is configured to be two small divided blades, since the mechanism to function the divided blades is configured to be compact so as to be composed of the main operation member, the sub operation member and the link member which connects the main operation member and the sub operation member, the arrangement space in the projector can be smaller than the conventional ones and the size of the apparatus can be reduced.

BEST MODE FOR CARRYING OUT THE INVENTION

The best mode will be explained with reference to 5 embodiments shown. Note that the first embodiment is a diaphragm apparatus for projectors in which a single intercepting blade composed of two divided blades is reciprocally functioned by a single electromagnetic actuator. The second embodiment, the third embodiment and the fifth embodiment are diaphragm apparatuses for projectors in which two intercepting blades composed of two respective divided blades are reciprocally functioned by a single electromagnetic actuator. The second embodiment, the third embodiment and the fifth embodiment are diaphragm apparatuses for projectors in which two intercepting blades composed of two respective divided blades are reciprocally functioned simultaneously in opposite directions by a single electromagnetic actuator. The fourth embodiment is a diaphragm apparatus for projectors in which two intercepting blades composed of two respective divided blades are reciprocally functioned simultaneously in opposite directions by each of the electromagnetic actuators.

Figure 12:
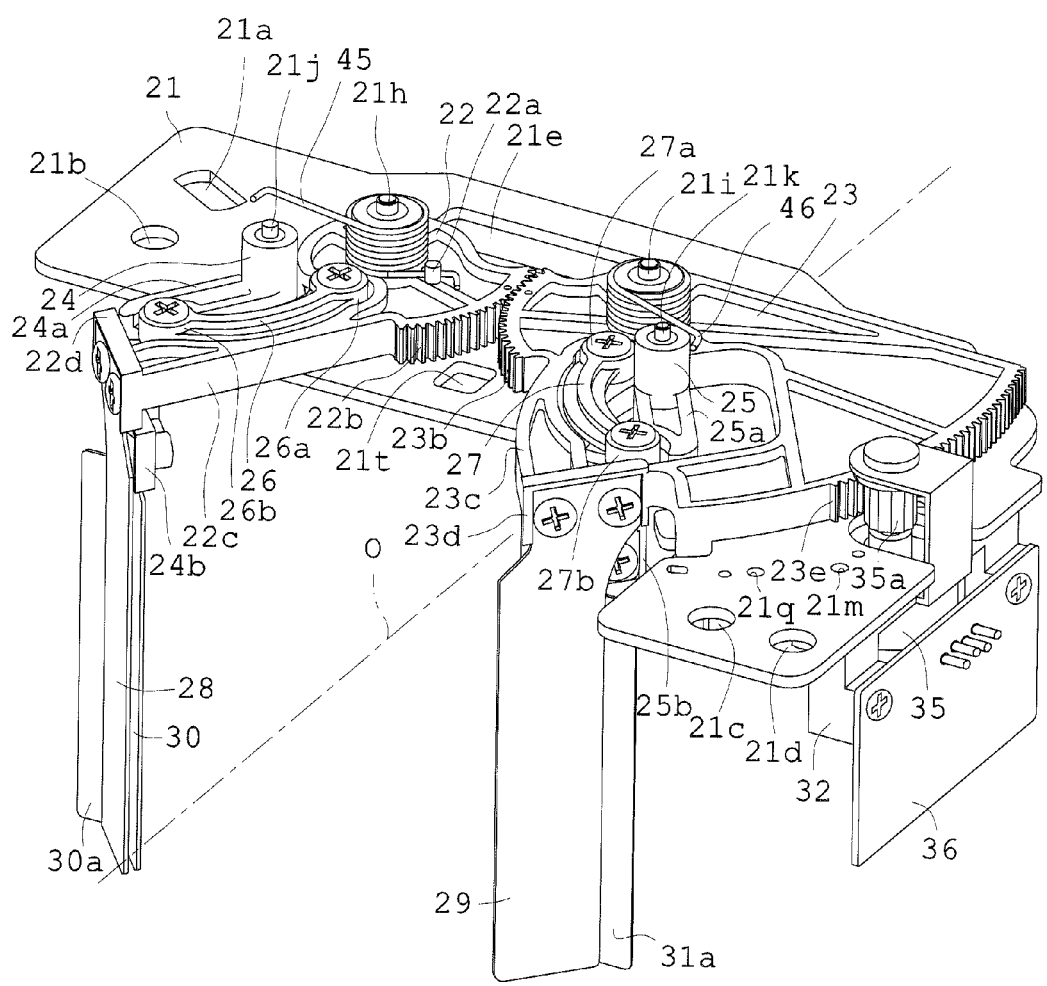
FIG. 12 is a perspective view of the second embodiment showing a fully opened state of the light path by two sets of intercepting blades in the similar manner as FIG. 6.
Figure 13:
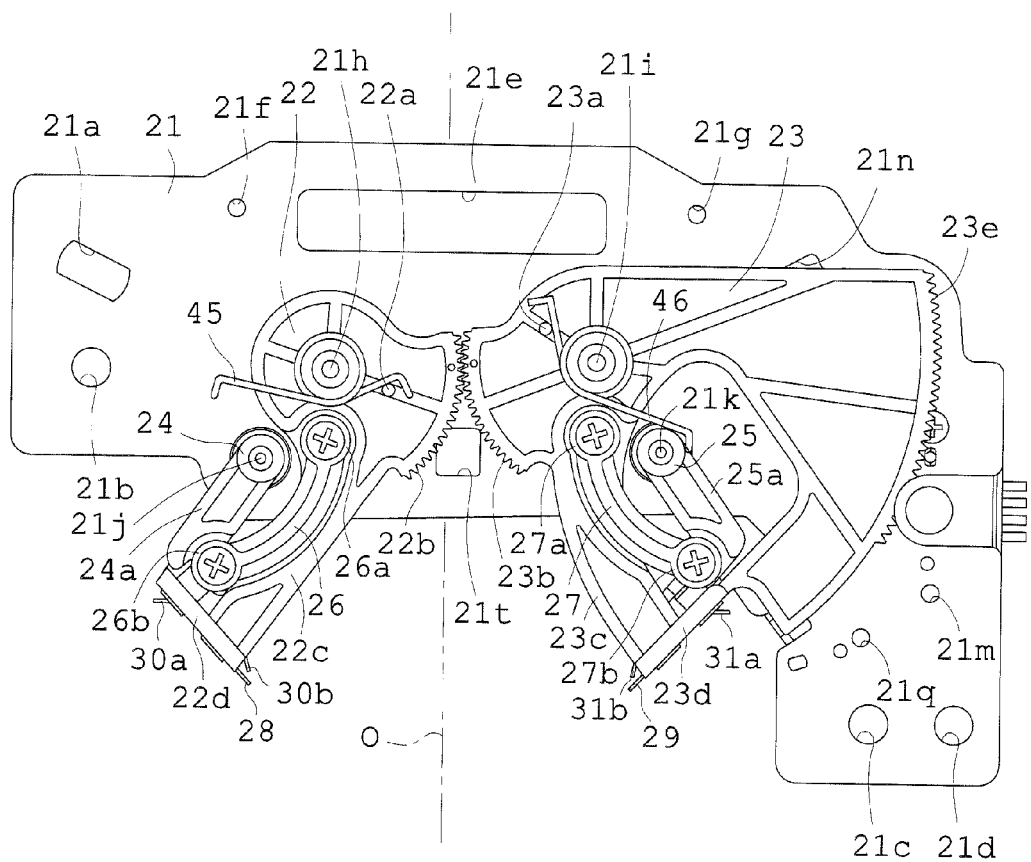
FIG. 13 is a top view of a state of FIG. 12 in the similar manner as FIG. 8.
Figure 14:
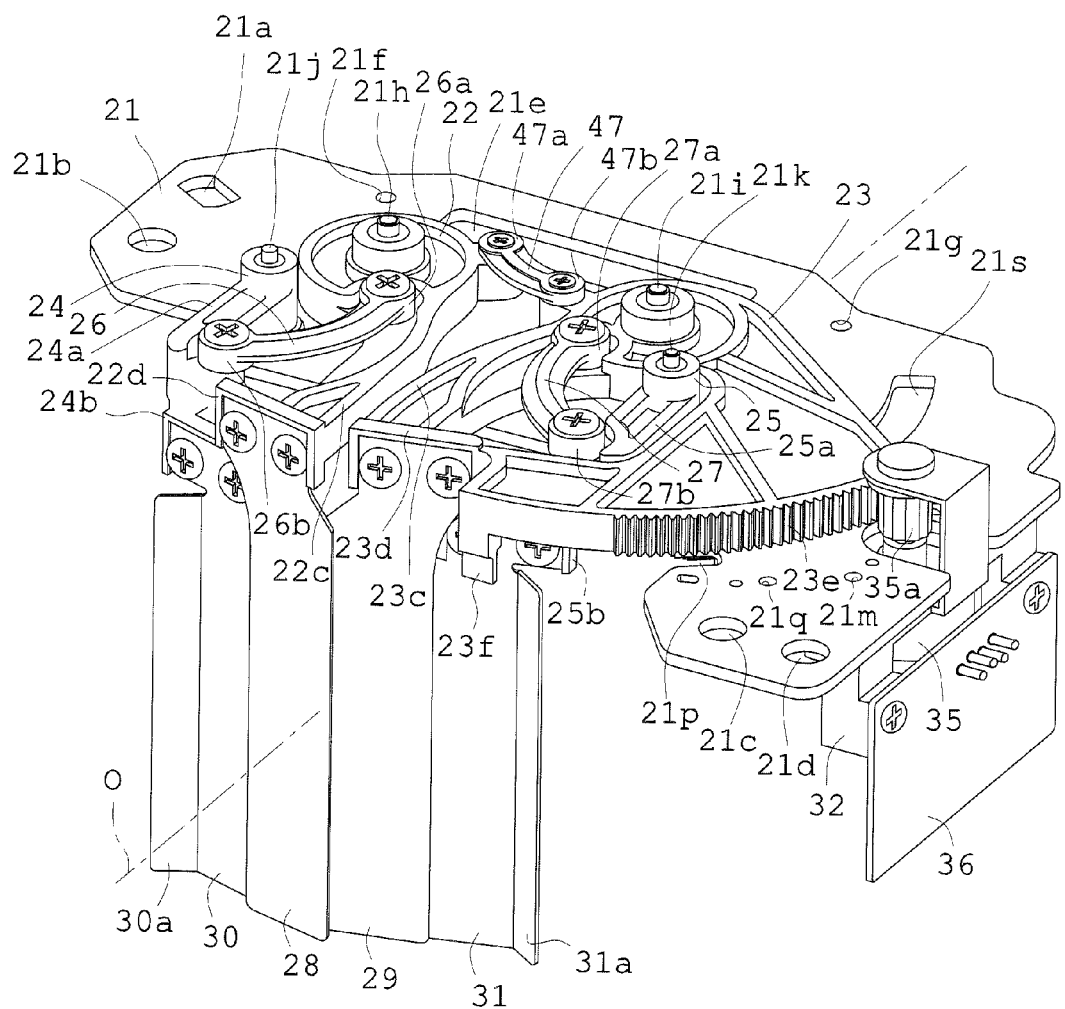
FIG. 14 is a perspective view of a third embodiment showing a state in which two sets of intercepting blades composed of two respective divided blades intercept the light path.
Figure 15:
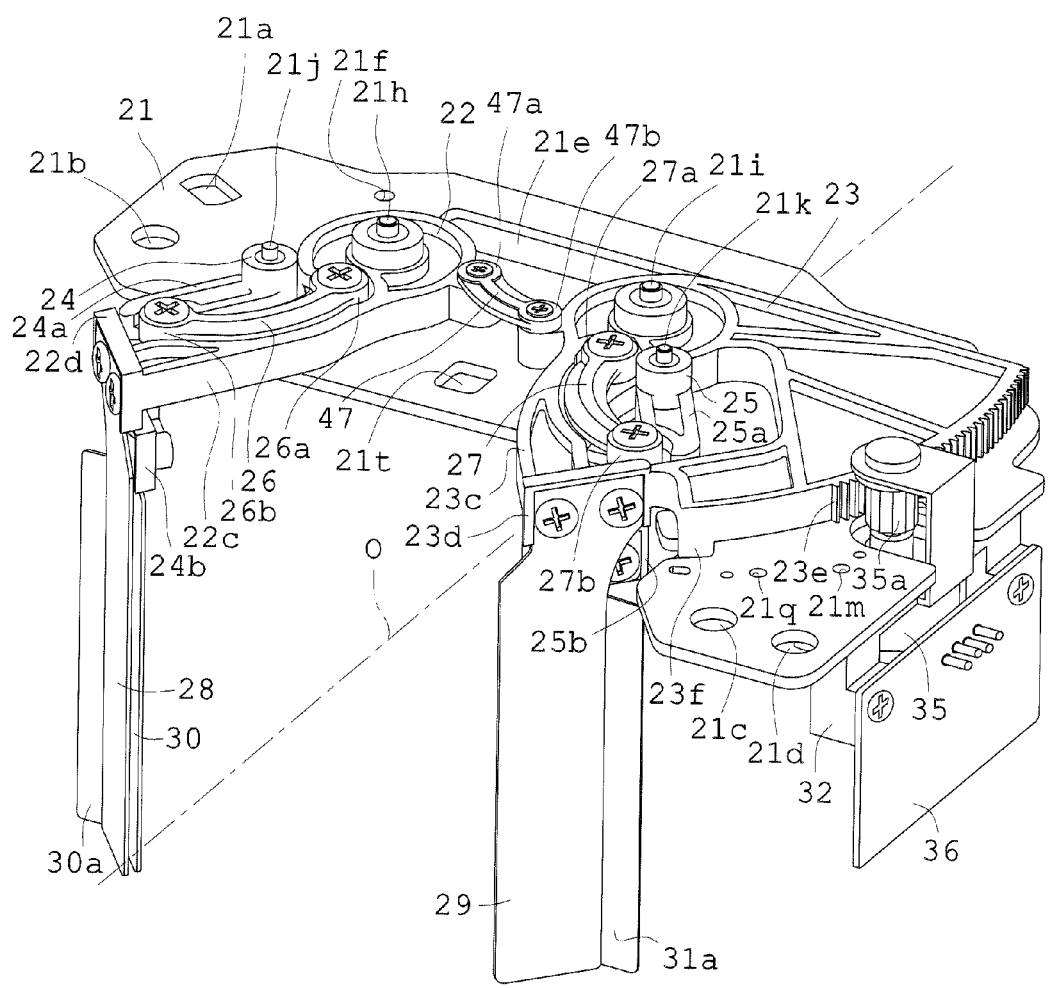
FIG. 15 is a perspective view of the third embodiment showing a fully opened state of the light path by two sets of intercepting blades in the similar manner as FIG. 14.
Figure 16:
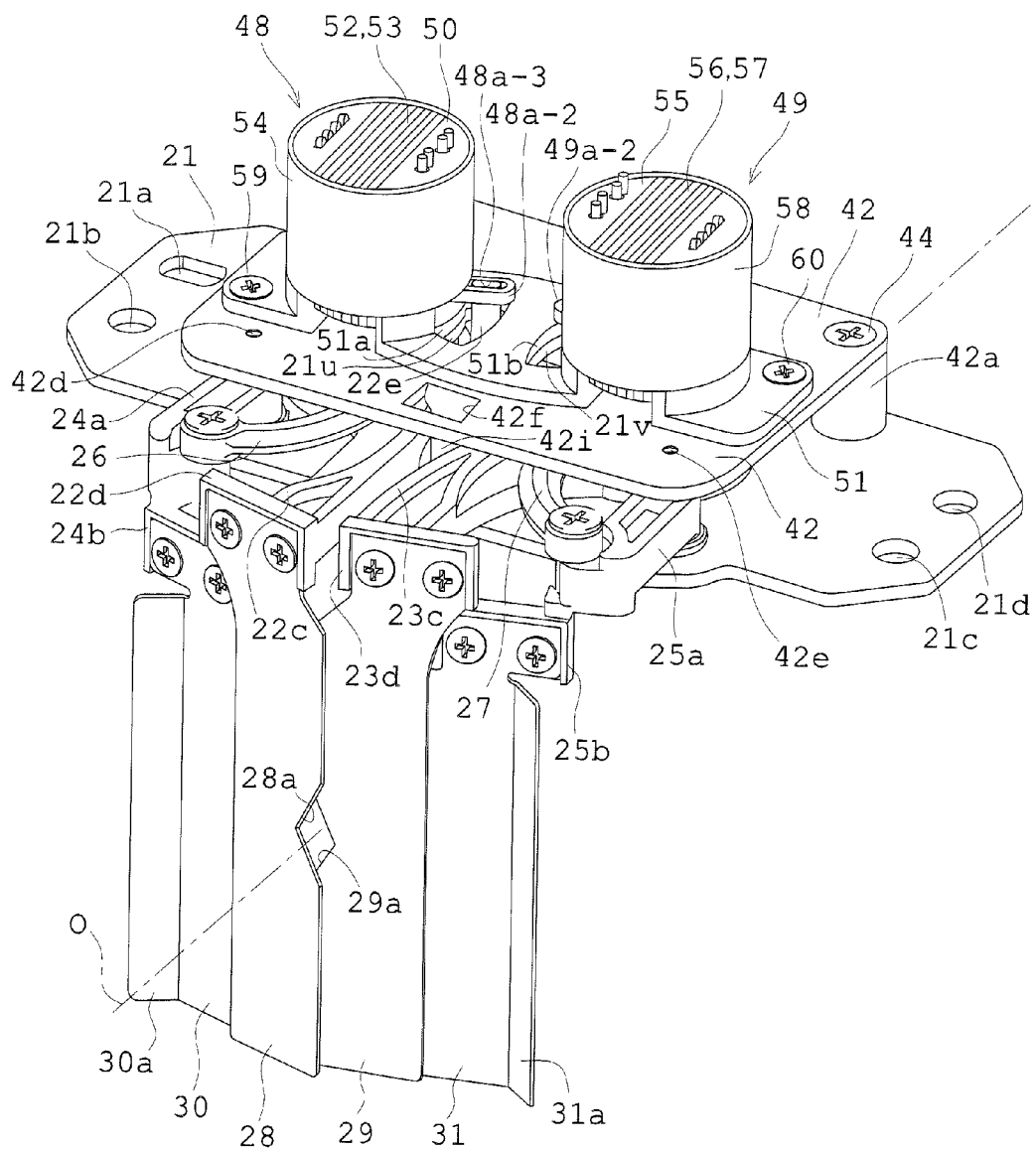
FIG. 16 is a perspective view of a fourth embodiment showing a state in which two sets of intercepting blades composed of two respective divided blades control the minimum light path.
Figure 17:
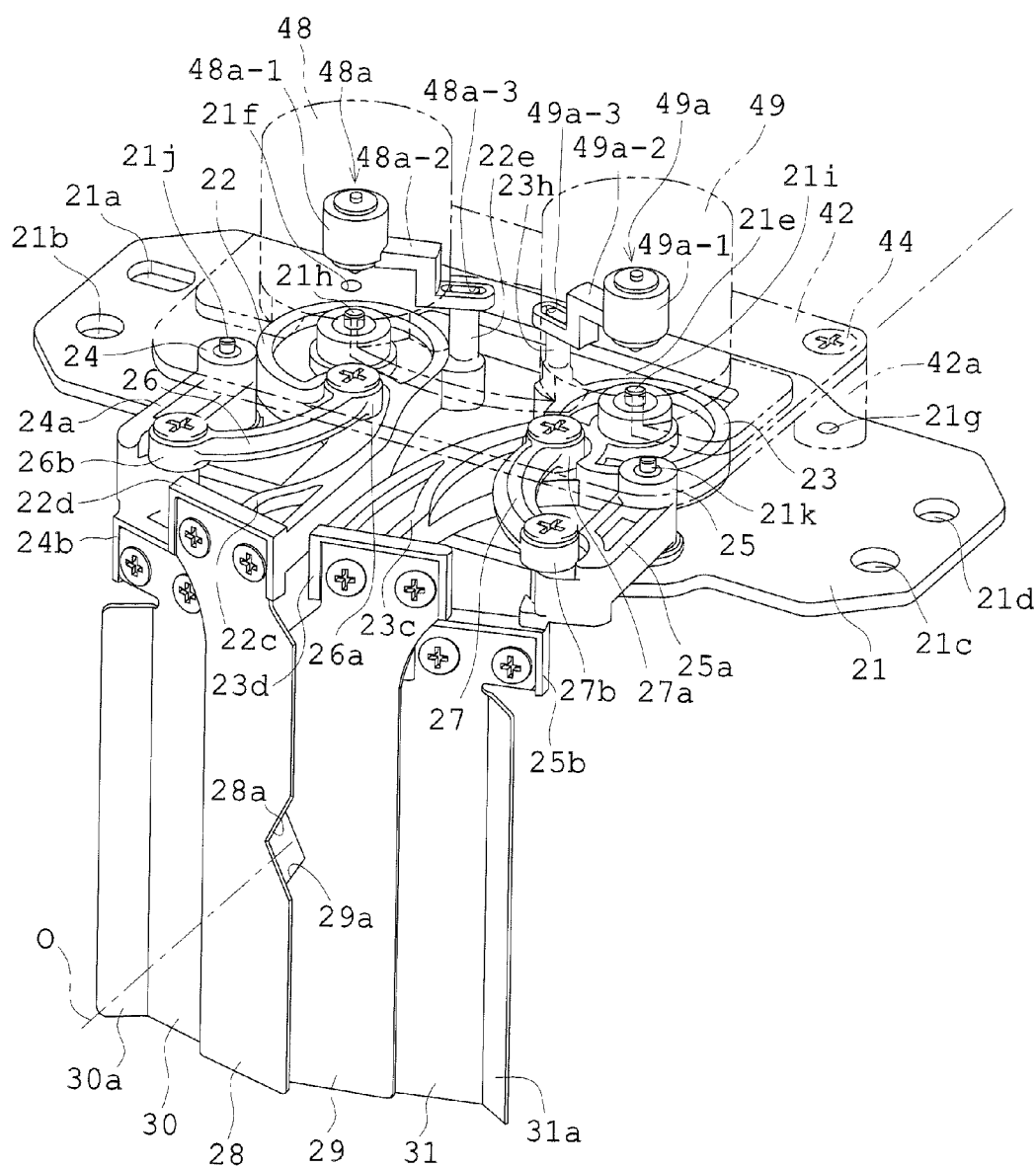
FIG. 17 is a perspective view showing a state of FIG. 16 in which outer shapes of cover members and two electromagnetic actuators are indicated by two-dot chain lines and only rotors of the two electromagnetic actuators are indicated by solid lines.
Figure 18:
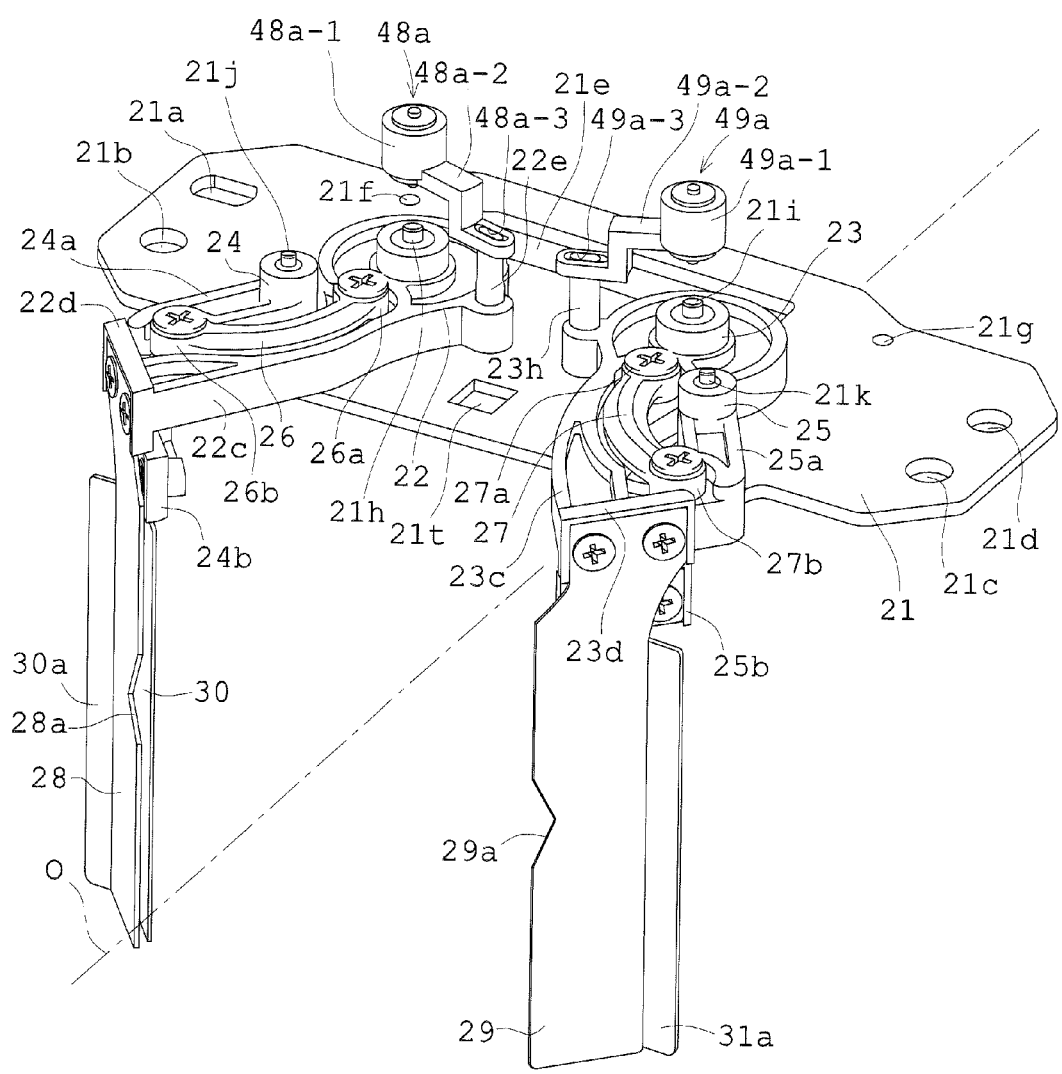
FIG. 18 is a perspective view of the fourth embodiment showing a fully opened state of the light path by the two sets of intercepting blades together with the rotors of the two electromagnetic actuators.

FIGS. 1-4 explain the first embodiment, FIGS. 5-13 explain the second embodiment, FIG. 14 and FIG. 15 explain the third embodiment, FIGS. 16-18 explain the fourth embodiment, and FIGS. 19-27 explain the fifth embodiment.

First Embodiment

First the structure of the present embodiment will be explained mainly with reference to FIGS. 1 and 2. A base plate 1 of the diaphragm apparatus for projectors of the present embodiment is made of metal on which a long hole 1a and three holes 1b, 1c and 1c are formed to incorporate into the body of the projector. The long hole 1a and the hole 1d are formed for mating positioning pins (not shown) built on the body of the projector. The base plate 1 is fixed on the body of the projector by inserting screws in the other two holes 1b and 1c.

When this diaphragm apparatus is incorporated into the projector, the light path of the light from the light source is formed from lower left to upper right on the lower side of the base plate 1. Therefore, the base plate 1 is adapted to be arranged with one plate surface facing toward the light path at an upper position of the light path of the light from the light source in the projector. Therefore, lower left side of the base plate 1 in FIGS. 1-4 is referred to as "light source side" hereinafter. Actually the base plate 1 may be arranged with its upper left side to be the light source side. Therefore, the light source of the diaphragm apparatus of the present invention may be arranged on either side. This also applies to second to fifth embodiments.

Figure 1:
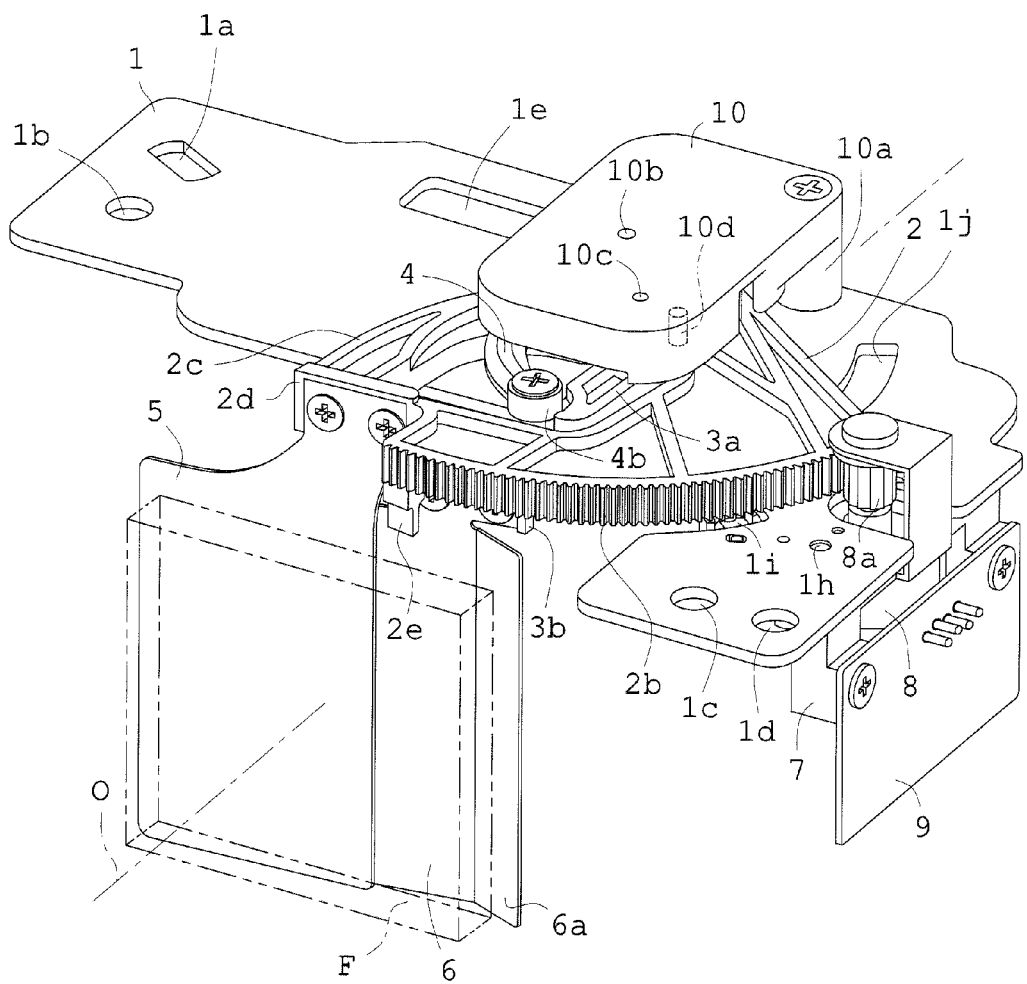
FIG. 1 is a perspective view of a first embodiment showing a state in which a set of intercepting blade composing of two divided blades intercepts a light path.

Thus, in the case of the present embodiment, when the diaphragm apparatus is built in the projector, a fly eye lens F is arranged on the light source side of the intercepting blade as indicated by two-dot chain lines in FIG. 1. One more fly eye lens F is arranged on the back side of the intercepting blade (not shown). In FIGS. 1-4, the center line O of the light path is indicated by a one-dot chain line.

In the projector of the present invention, the diaphragm apparatus of the present embodiment may be arranged with the base plate 1 that is adapted to be positioned either in the up and down direction of the light path, or in the left and right direction of the light path in the projector. However, as shown in FIGS. 1-4, when the base plate 1 is arranged in the upper position of the light path, heat remains in the lower side of the base plate 1 and may affect the durability of a later described stepping motor which is mounted on the light path side of the base plate 1. Therefore, in the case of the present embodiment, a long hole 1e is formed in the base plate 1 to release the heat upward.

Figure 2:
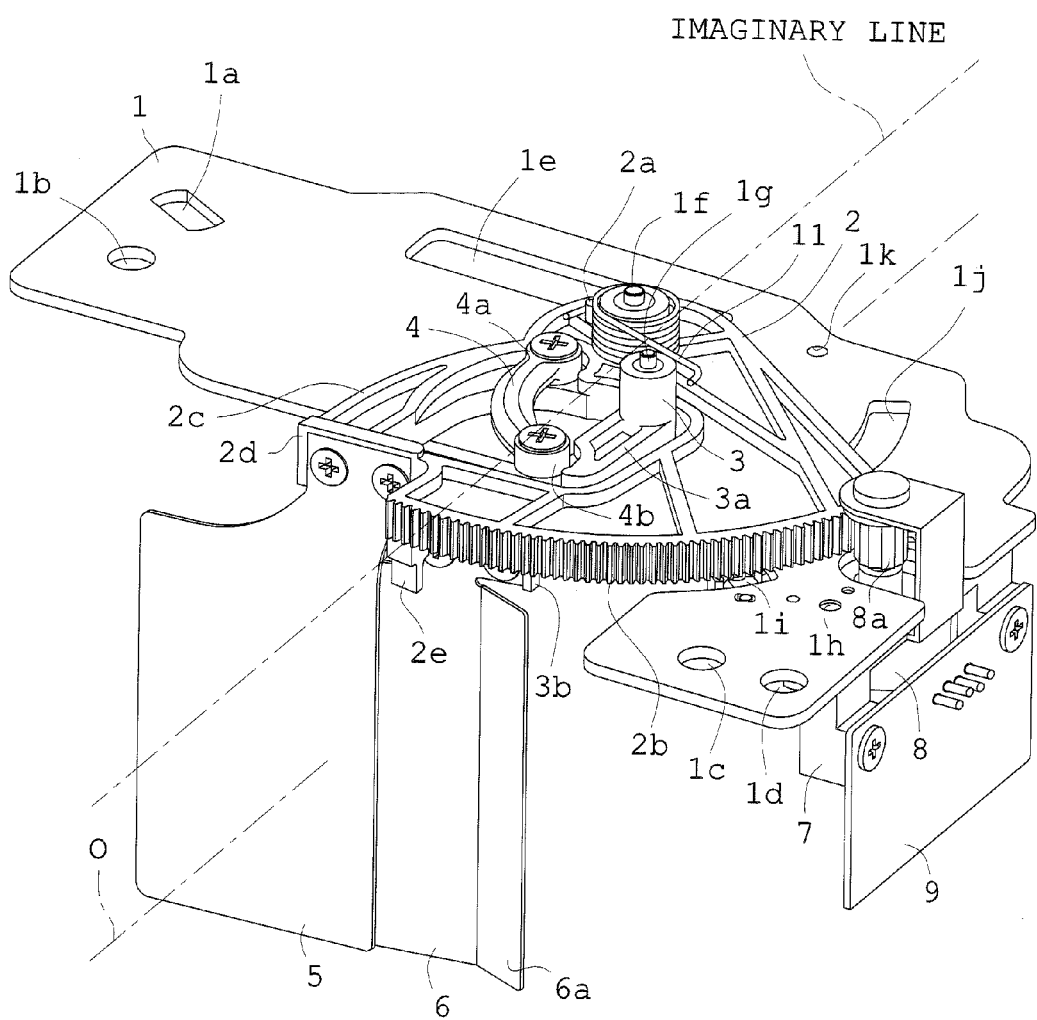
FIG. 2 is a perspective view showing a state of FIG. 1 with a cover member removed.

In addition, as shown in FIG. 2, a main shaft 1f and a sub shaft 1g are vertically arranged on the base plate 1 on the opposite side of the light path. The main shaft 1f is vertically arranged right above and off the center line of the light path on the right side. Also, the sub shaft 1g is vertically arranged closer to the light source side than the main shaft 1f, and on the right side of imaginary line which is parallel to the center line of the light path and passing over the installed position of the main shaft 1f.

A main operation member 2 made of synthetic resin is rotatably installed to the main shaft 1f. The main operation member 2 has a spring hook portion 2a, a gear portion 2b, and an arm portion 2c. A mounting portion 2d is formed at the end of the arm portion 2c extruding to the light source side.

Figure 4:
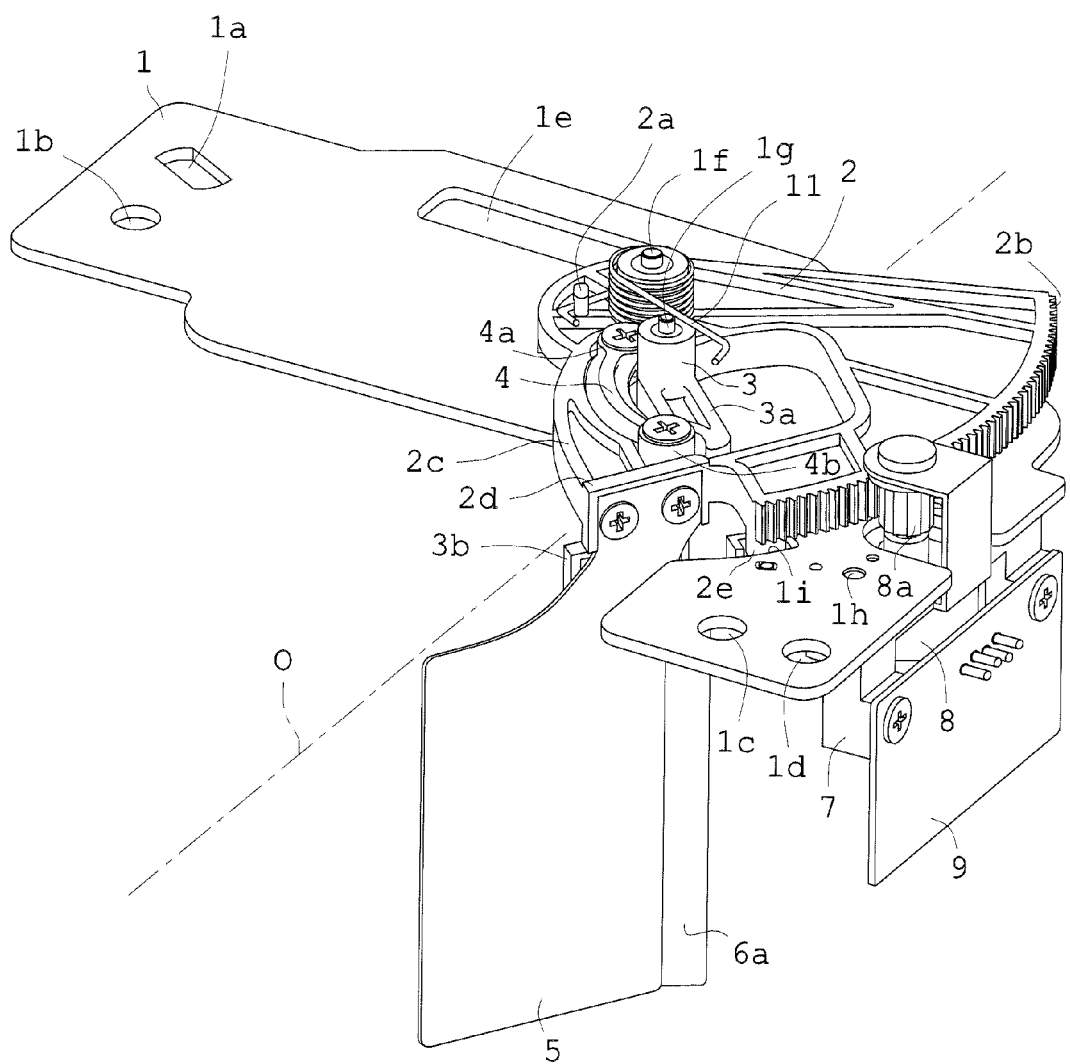
FIG. 4 is a perspective view of the first embodiment showing a fully opened state of the light path by the intercepting blades in the similar manner as FIG. 2.

A sub operation member 3 made of synthetic resin is rotatably installed to the sub shaft 1g. The sub operation member 3 has an arm portion 3a which extrudes to the light source side. A mounting portion 3b is formed at the end of the arm portion 3*a*. The mounting portion 2*d* of the main operation member 2 is closer to light source than the mounting portion 3*b* of the sub operation member 3, although it is difficult to read from the drawings. In addition, as can be seen in FIG. 4, the mounting portion 3*b* of the sub operation member 3 is situated lower than the mounting portion 2*d* of the main operation member 2. Therefore, the mounting portion 2*d* does not interfere with the mounting portion 3*b* mutually.

As can be seen in FIG. 2, the main operation member 2 and sub operation member 3 are connected by a link member 4. One end 4*a* of the link member 4 is rotatably installed to the main operation member 2 near the position of the main shaft 1*f* and another end thereof 4*b* is rotatably installed to the sub operation member 3 near the position of the mounting portion 3*b*.

A main divided blade 5 made of metal is installed to the mounting portion 2*d* of the main operation member 2 with two screws. A sub divided blade 6 made of metal composing the intercepting blade together with the above described main divided blade 5 is installed to the mounting portion 3*b* of the sub operation member 3 with two screws. In addition, a bended portion 6*a* is formed on the sub divided blade 6 by bending the area along the edge in the direction retreating from the light path to the light source, in other words, to the main divided blade 5. The main divided blade 5 and sub divided blade 6 can move in the light path by simultaneously rotating the main operation member 2 and the sub operation member 3 in the same direction while varying the area of mutually superposed area.

Both of the two divided blades 5 and 6 are arranged obliquely when they move in the light path such that almost entire light hit on the surface on the light source side is reflected to the side of the light path (lower right in FIGS. 1-4).

Note that the two divided blades 5 and 6 are of metal in the present embodiment, but they may be made of synthetic resin 1*f* a predetermined heat resistance can be obtained. In that case, the two divided blades 5 and 6 may be molded with operation members 2 and 3. Although operation members 2 and 3 are made of synthetic resin in the present embodiment, they may also be made of metal as the divided blades 5 and 6.

A motor mounting member 7 is installed on the side of the light path of the base plate 1 at a position off the light path by two screws (not shown). A screw hole 1*h* formed in the base plate 1 is used for fitting one of the two screws. A stepping motor 8 is installed on the motor mounting member 7 and a gear 8*a* installed on the output shaft of the motor 8 engages with the gear portion 2*b* formed on the above described main operation member 2. A print circuit board 9 is also installed to the motor mounting member 7 by two screws.

A to-be-detected portion 2*e* is formed on the above described main operation member 2 at the underside of the left end of the gear portion 2*b*. A cut portion 1*i* for the to-be-detected portion 2*e* to go in, when the main operation member 2 rotates counterclockwise, is formed on the base plate 1. A photoelectric sensor (not clearly shown) is mounted on the side of the light path of the base plate 1 by screws. The photoelectric sensor has a light emitting section and a light receiving section and can detect the rotational position of the main operation member 2 when the to-be-detected portion 2*e* goes in the cut portion 1*i* and intercepts the light entering the light receiving section. This allows the photoelectric sensor to sense the fully opened state of the light path by the two divided blades 5 and 6.

In addition, the state of intercepting the light path by the two divided blades 5 and 6, in other words, the rotational position of the main operation member 2 can be detected by similar means. Though not clearly shown, another to-be-detected portion is formed on the main operation member 2 and is inserted in the circular long hole 1*j* formed in the base plate 1, the main shaft 1*f* being at the center. One more photoelectric sensor is installed by screws on the plane of the light path of the base plate 1.

As shown in FIG. 1, a cover member 10 is installed on the base plate 1. The cover member 10 is made of synthetic resin and is secured to the base plate 1 using screws by adjusting a cylinder portion 10*a* to a screw hole 1*k* that is formed in the base plate 1 (refer to FIG. 2). A hole10*b* fitting the end of the above described main shaft 1*f* and a hole10*c* fitting the end of the above described sub shaft 1*g* are formed in the cover member 10 and a spring hook portion 10*d* is installed on the surface of the base plate 1 side.

Further as shown in FIG. 2, a coil spring 1*l* is wound around the main shaft 1*f*, one end of the coil spring 1*l* is hooked to the spring hook portion 2*a* of the main operation member 2 and another end of the coil spring 1*l* is hooked to the spring hook portion 10*d* of the cover member 10. The coil spring 1*l* is installed such that the main operation member 2 prevents the main shaft 1*f* from shaking in the axis direction and backlash between the gear portion 2*b* and the gear 8*a* is removed.

Note that, in the present embodiment, the main shaft 1*f* and the sub shaft 1*g* are vertically arranged on the plate surface of the base plate 1 opposite to the light path side. The main operation member 2 and the sub operation member 3 are installed to the main shaft 1*f* and the sub shaft 1*g*. However, the present invention is not limited to this structure. The main shaft 1*f* and the sub shaft 1*g* may be vertically arranged on the plate surface of the base plate 1 on the light path side. The main operation member 2, the sub operation member 3 and the link member 4 may be arranged on the light path side of the base plate 1.

Subsequently, the operation of the present embodiment will be explained. FIGS. 1 and 2 show the state in which the light path of the light from the light source is intercepted. The diaphragm apparatus for projectors of the present invention may always be in this state when the power source of the projector turns off. However, in the present embodiment, this state shows the time when a light source lamp is turned on but no image is projected on the screen. Therefore, this state shows that the light path is temporarily intercepted by the two divided blades 5 and 6. Therefore, according to the present embodiment, the screen is dark when no images or letters are projected. In addition, by doing so, deterioration of performance of liquid crystal panel can be prevented because there is no light from the light source on the liquid crystal panel in the case of the liquid crystal projector.

Figure 3:
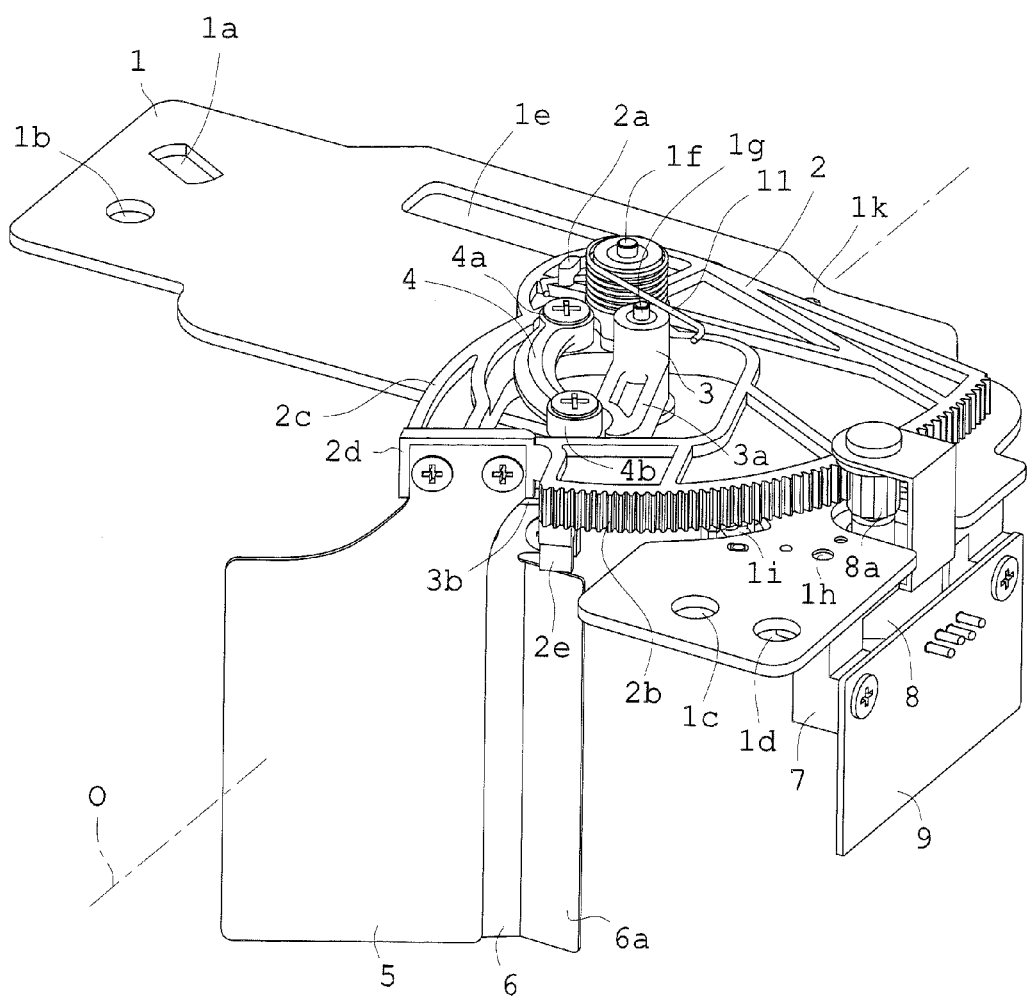
FIG. 3 is a perspective view of the first embodiment showing a state in which the intercepting blade partially opens the light path in the similar manner as FIG. 2.

When projection is started from this state, the stepping motor 8 is energized to rotate the gear 8*a*. Therefore, the main operation member 2 is rotated counterclockwise. Therefore, the main operation member 2 rotates the sub operation member 3 counterclockwise via the link member 4. Since the distance from the main shaft 1*f* to the end portion 4*a* of the link member 4 is shorter than the distance from the sub shaft 1*g* to another end portion 4*b* of the link member 4, the rotation speed of the sub operation member 3 is slower than the rotation speed of the main operation member 2. Therefore, and the main divided blade 5 and the sub divided blade 6 rotate counterclockwise while the superposed area of the main divided blade 5 and the sub divided blade 6 is being increased. FIG. 3 thus shows the state in which the main divided blade 5 partially opens the light path and stops at a predetermined light intensity control position.

When illumination light intensity by the light from the light source is intensified from the state shown in FIG. 3, the stepping motor 8 is rotated in the same direction thus far until the predetermined light intensity is acquired. When illumination light intensity by the light from the light source is decreased, the stepping motor 8 is rotated in the reverse direction until the predetermined light intensity is acquired.

FIG. 4 shows a state in which the light path is fully opened in order to increase the illumination light intensity by the light from the light source. The sub divided blade 6 of the present embodiment forms the bended portion 6*a*. Because, in this state, the sub divided blade 6 does not interfere with a member (for example, a frame body on which a fly eye lens is installed) of the project body (not shown) arranged on the backside. In the present embodiment, in this state, the superposed area of the main divided blade 5 and the sub divided blade 6 is at a maximum to make accommodating space for the main divided blade 5 and the sub divided blade 6 efficiently.

Note that, as shown in FIG. 1, the diaphragm apparatus of the present embodiment is structured such that the light path can be intercepted completely by the two main divided blade 5 and the sub divided blade 6. However, the present invention is not limited to this structure. For example, the main operation member 2 may be rotated from the state of FIG. 4 up to the state of FIG. 3 or up to a state in which the main operation member 2 is further rotated clockwise and the light path forms a slit.

In addition, in the present embodiment, driving means is the stepping motor 8. However, the electromagnetic actuator of the present invention is not limited to a single stepping motor and the driving means may be various types of reciprocally movable motors. In addition, when the diaphragm apparatus of the present embodiment is adopted, for example, as an overhead projector, the main operation member 2 may be rotated manually without providing the stepping motor 8.

Further in the present embodiment, the main operation member 2 is rotatably installed with regard to the main shaft 1*f* that is vertically arranged on the base plate 1 and the sub operation member 3 is rotatably installed with regard to the sub shaft 1*g* that is vertically arranged on the base plate 1. However, installation configuration of each operation member with regard to the base plate 1 is not limited to the structure. For example, one of these operation members may form a shaft at a rotation center and may rotatably fit in the shaft with regard to a hole formed in the base plate 1.

Second Embodiment

Subsequently, the second embodiment will be explained with reference to FIGS. 5-13. First, the structure of the present embodiment will be explained with reference to FIGS. 5-9. A base plate 21 of the present embodiment is also made of metal and the shape of the plate is clearly shown in FIGS. 8 and 9. A long hole 21*a* and three holes 21*b*, 21*c* and 21*c* are formed to incorporate the base plate into the body of the projector. The base plate 21 is fixed on the body of the projector similar to the base plate 1 of the first embodiment.

Figure 5:
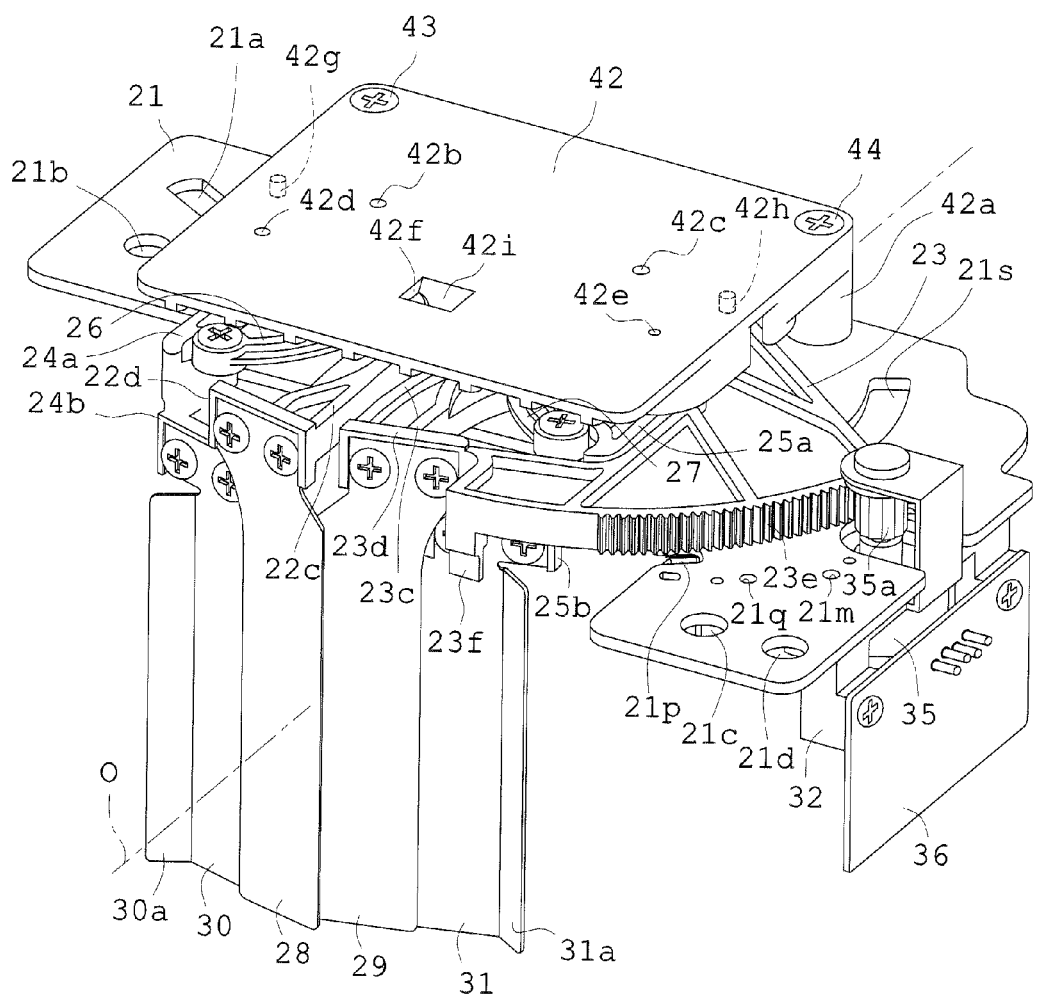
FIG. 5 is a perspective view of a second embodiment showing a state in which two sets of intercepting blades composed of two respective divided blades intercept the light path.
Figure 6:
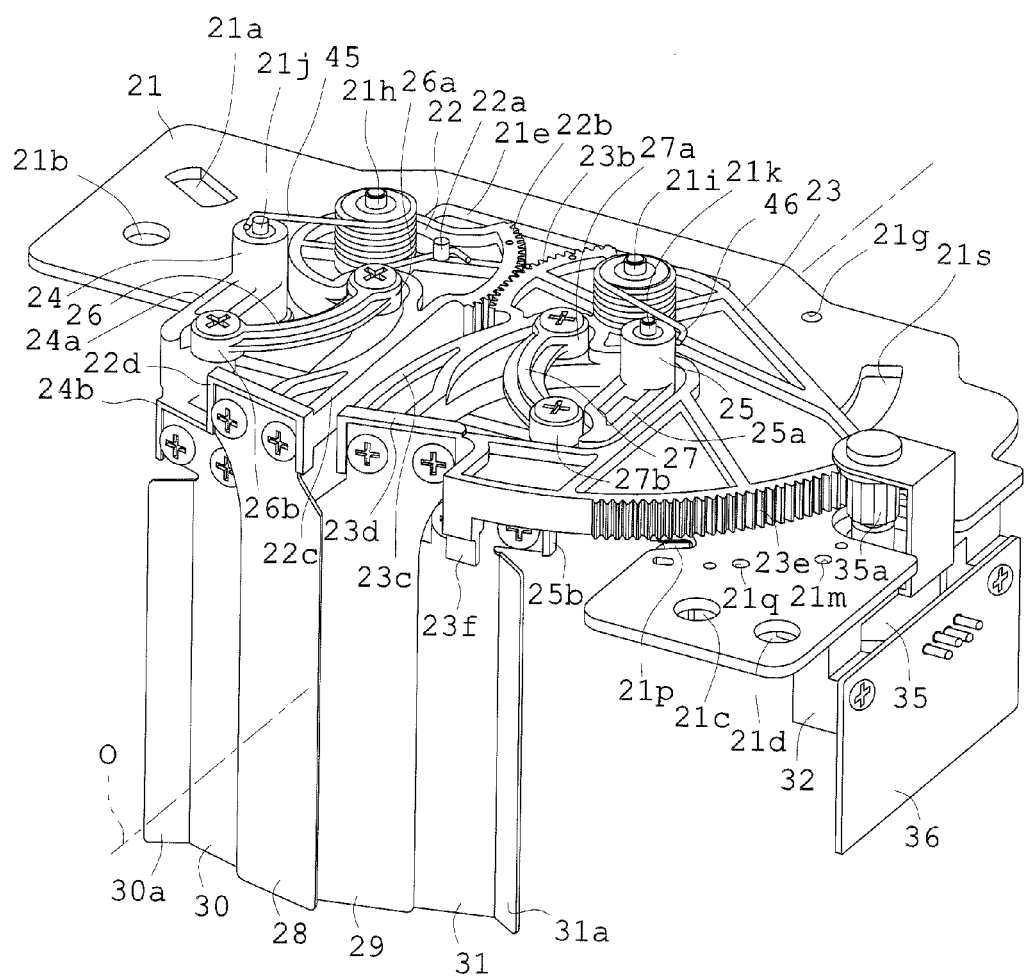
FIG. 6 is a perspective view showing a state of FIG. 5 with a cover member removed.
Figure 7:
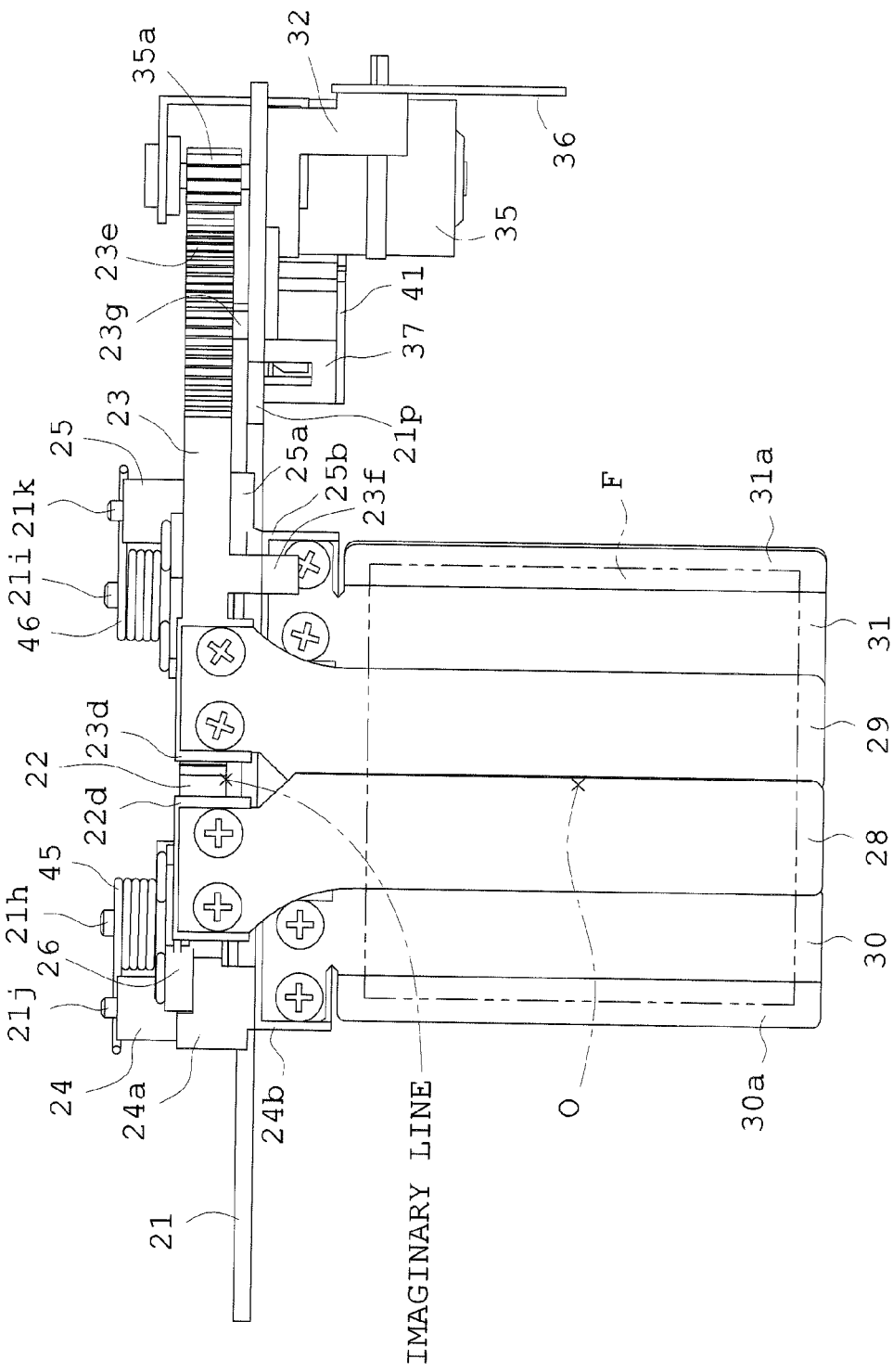
FIG. 7 is an elevation of a state of FIG. 5 with the cover member removed.
Figure 8:
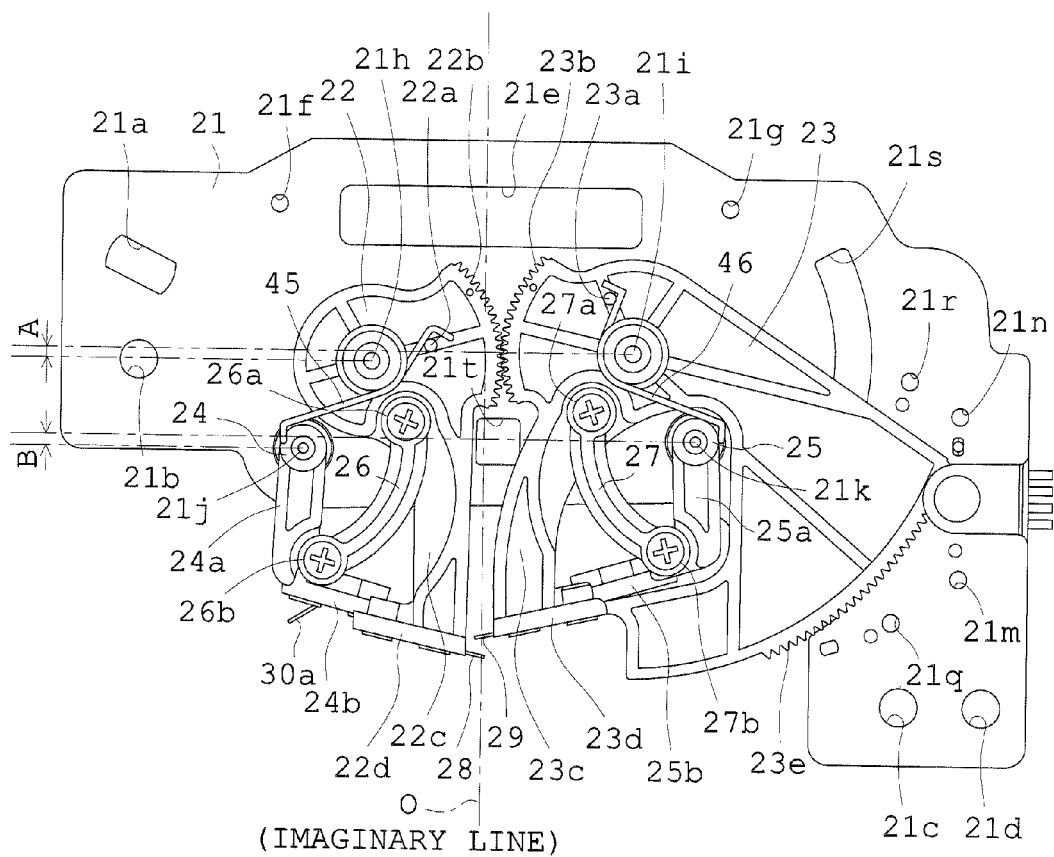
FIG. 8 is a top view of FIG. 7.
Figure 9:
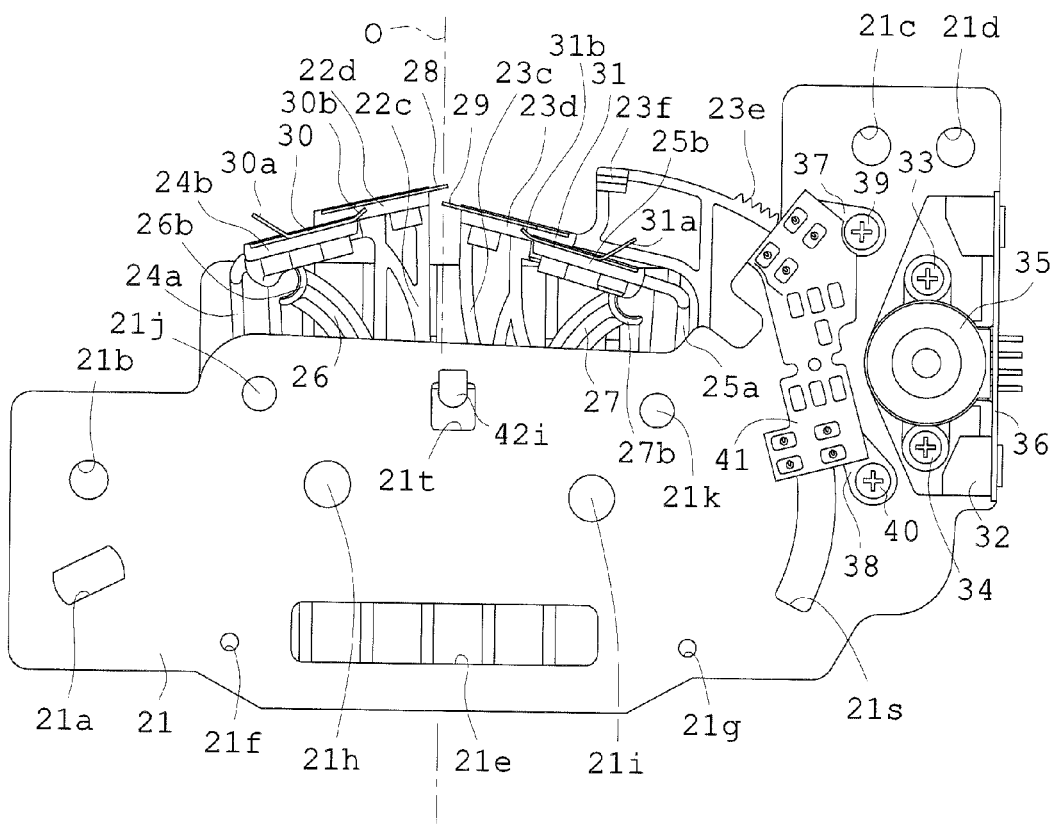
FIG. 9 is a bottom view of FIG. 7.

In addition, when this diaphragm apparatus is incorporated into the projector, the light path of the light from the light source is formed from lower left to upper right in FIG. 5 and FIG. 6, from front to rear in FIG. 7, from down to up in FIG. 8, and from up to down in FIG. 9. Therefore, lower left side of the base plate 21 in FIGS. 5 and 6, front side in FIG. 7, lower side in FIG. 8 and upper side in FIG. 9 are referred to as "light source side" hereinafter. Also in the present embodiment, the base plate 21 may be located at an upper position of the light path of the light from the light source with one of its plate surface facing toward the light path in the projector.

Also in the case of the present embodiment, when the diaphragm apparatus is built in the projector, an intercepting blade is interposed between two fly eye lenses. In FIG. 7, only the fly eye lens F arranged on the light source side is indicated by a two-dot chain line. In addition, in each figure used for explaining the present embodiment, the center line O of the light path is indicated by a one-dot chain line.

As clearly shown in FIG. 8, a rectangular long hole 21*e* and screw holes 21*f* and 21*g* in the base plate 21 on both sides thereof in the longitudinal direction are formed. The reason for making the long hole 21*e* is the same as the long hole 1*e* of the first embodiment.

Two main shafts 21*h* and 21*i* and two sub shafts 21*j* and 21*k* are vertically arranged on the opposite side of the light path on the base plate 21. Their heights are the same. In the present embodiment, the main shafts 21*h* and 21*i* are vertically arranged on both sides of an imaginary line (a line superposed with the center line O of the light path in FIG. 7 and FIG. 8), which is closest and parallel to the center line O of the light path, at positions substantially equally spaced from the imaginary line on the base plate 21. Also, the sub shafts 21*j* and 21*k* are vertically arranged likewise at positions substantially equally spaced from the imaginary line. The distance between the sub shafts 21*j* and 21*k* is larger than the distance between the main shafts 21*h* and 21*i*.

However, in the present embodiment, the main shafts 21*h* and 21*i* are not vertically arranged on the same predetermined line perpendicular to the above described imaginary line. As shown in FIG. 8, they are vertically arranged at positions displaced by space A from the predetermined line each other in the direction along the light path (up and down direction). Therefore, it may be said that the main shafts 21*h* and 21*i* are vertically arranged on both sides of a determined line perpendicular to the above described imaginary line. In addition, the sub shafts 21*j* and 21*k* likewise are not vertically arranged on the same predetermined line perpendicular to the above described imaginary line. As shown in FIG. 8, they are vertically arranged at positions displaced by space B from the predetermined line each other in the direction along the light path. The direction of the displacement is the same as the main shafts 21*h* and 21*i* and the shift length is substantially same (A=B).

Main operation members 22 and 23 made of synthetic resin are rotatably installed on the main shafts 21*h* and 21*i*. The main operation members 22 and 23 have spring hook portions 22*a* and 23*a*. Mutually engaging gear portions 22*b* and 23*b* are formed at the circumferences of the main shafts 21*h* and 21*i*. Main operation members 22 and 23 have arm portions 22*c* and 23*c* on the light source side. Mounting portions 22*d* and 23*d* are formed at the ends of the arm portions 22*c* and 23*c*. The distance from the main shaft 21*h* to the mounting portion 22*d* is the same as the distance from the main shaft 21*i* to the mounting portion 23*d*. As a result, in FIG. 8, the mounting portion 22*d* of the main operation member 22 is closer to the light source than the mounting portion 23*d* of the main operation member 23. Further, one more gear portion 23*e* is formed in the lower right portion in FIG. 8 on the main operation member 22.

Sub operation members 24 and 25 made of synthetic resin are rotatably installed to the sub shafts 21*j* and 21*k*. The sub operation members 24 and 25 have arm portions 24*a* and 25*a* which extrude to the light source side. Mounting portions 24*b* and 25*b* are formed at the end of the arm portions. The distance from the sub shaft 21*j* to the mounting portion 24*b* is the same as the distance from the sub shaft 21*k* to the mounting portion 25*b*. In FIG. 8, the mounting portion 22*d* of the main operation member 22 is closer to the light source than the mounting portion 24b of the sub operation member 24. The mounting portion 23d of the main operation member 23 is closer to the light source than the mounting portion 25b of the sub operation member 25. Furthermore, as shown in FIG. 7, the mounting portion 24b of the sub operation member 24 is positioned lower than the mounting portion 22d of the main operation member 22 not to interfere each other. The mounting portion 25b of the sub operation member 25 is positioned lower than the mounting portion 23d of the main operation member 23 not to interfere each other.

The main operation member 22 and the sub operation member 24 are linked by rotatably installing an end of 26a of a link member 26 to the main operation member 22 at a place close to the main shaft 21h and by rotatably installing another end of 26b of the link member 26 at a place close to the mounting portion 24b of the sub operation member 24. The main operation member 23 and the sub operation member 25 are linked by rotatably installing an end of 27a of a link member 27 to the main operation member 23 at a place close to the main shaft 21i and by rotatably installing another end of 27b of the link member 27 to a place close to the mounting portion 25b of the sub operation member 25.

A main divided blade 28 made of metal is installed to the mounting portion 22d of the main operation member 22 with two screws. A sub divided blade 29 made of metal is installed to the mounting portion 23b of the main operation member 23 with two screws. The main divided blades 28 and 29 can move in the light path by the main operation members 22 and 23. As described above, in the state shown in FIG. 8, since the mounting portion 22d is located closer to the light source than the mounting portion 23d, they do not interfere each other and, looking from the light source side, the main divided blades 28 and 29 are partially superposed.

Note that, in the present embodiment, as described above, since the vertically arranged positions of the main shaft 21h and the main shaft 21i are mutually displaced and the distances from the main shaft 21h and the main shaft 21i to the mounting portions 22d and 23d are equal, the main divided blades 28 and 29 do not interfere and the state shown in FIG. 8 can be obtained. However, it is possible to acquire the state of FIG. 8 without the structure of the present embodiment by vertically installing the main shaft 21h and the main shaft 21i on the same line perpendicular to the imaginary line on the base plate 21, by making the distance from the main shaft 21i to the mounting portion 23d shorter than the distance from the main shaft 21h to the mounting portion 22d, by vertically installing the sub shaft 21j and the sub shaft 21k on the same line perpendicular to the imaginary line on the base plate 21, and by making the distance from the sub shaft 21k to the mounting portion 25b shorter than the distance from the sub shaft 21j to the mounting portion 24b. Therefore, thus structured apparatus also is the diaphragm apparatus of the present invention.

A sub divided blade 30 made of metal which constructs one intercepting blade with the above described main divided blade 28 is installed to the mounting portion 24b of the sub operation member 24 by two screws. A sub divided blade 31 made of metal which constructs another intercepting blade with the above described main divided blade 29 is installed to the mounting portion 25b of the sub operation member 25 by two screws. The sub divided blade 30 is moved in the light path by the sub operation member 24 varying the area superposed with the main divided blade 28. The sub divided blade 31 is moved in the light path by the sub operation member 25 varying the area superposed with the main divided blade 29. Further, the sub divided blade 30 and 31 have bended portions 30a and 31a that are formed by bending the areas along end edges in the direction away from the light path to the light source side and, as shown only in FIG. 9, the sub divided blade 30 and 31 have bended portions 30b and 31b that are formed by bending the areas along end edges in the direction advancing toward the light path to the light source side.

These four divided blades 28, 29, 30 and 31 are arranged obliquely with regard to the light path when they move in the light path and almost entire light hit on the light source side surface is reflected to the lateral position of the light path. However, as can be seen from FIGS. 8 and 9, in the intercepted state of the light path, a portion of light reflected at the sub divided blades 30 and 31 enters between the main divided blades 28 and 29. A portion of light reflected at the main divided blade 29 enters between the main divided blades 28 and 29.

Therefore, in the case of the present embodiment, the back surfaces of the main divided blades 28 and 29, that is, surfaces opposite to the light source are made as matte surfaces (glossy surface). Further, the light reflected at the sub divided blades 30 and 31 and entered between the main divided blades 28 and 29, and the light reflected at the main divided blade 29 and entered between the main divided blades 28 and 29 are adapted to be attenuated by applying black coating on top of the matte surfaces. In addition, the light reflected at the sub divided blades 30 and 31 and entered between the main divided blades 28 and 29 is adapted to be reflected back to the entered direction by forming bended portions 30b and 31b on the sub divided blades 30 and 31. In the present embodiment, leaking light is reduced in this way in the intercepted state. Performing only one of the three means is effective.

Note that the four divided blades 28, 29, 30 and 31 are made of metal in the present embodiment, but they may be made of synthetic resin 1f a predetermined heat resistance can be obtained. In that case, they may be molded with respective operation member 22, 23, 24 and 25. Although respective operation member 22, 23, 24 and 25 are made of synthetic resin in the present embodiment, they may also be made of metal same as the divided blades 28, 29, 30 and 31 if necessary. This applies to each embodiment below.

A motor mounting member 32 is installed on the surface of the light path side of the base plate 21 by fitting two screws 33 and 34 (refer to FIG. 9) into screw holes 21m and 21n (refer to FIG. 8). A stepping motor 35 is installed on the motor mounting member 32 and a gear 35a installed on the output shaft of the motor 35 engages with the gear portion 23e formed on the above described main operation member 23. In addition, a print circuit board 36 is also installed to the motor mounting member 32 by two screws. Note that the stepping motor 8 of the above described first embodiment is installed on the base plate 1 with the same structure as the present embodiment.

Two to-be-detected portions 23f and 23g are formed on the main operation member 23. Only a portion of the to-be-detected portion 23g is shown in FIG. 7. In addition, a cut portion 21p in which the to-be-detected portion 23f enter when the main operation member 2 rotates, and a circular long hole 21s in which the to-be-detected portion 23g is inserted are formed in the base plate 21. Also, as shown in FIG. 9, two photoelectric sensors are fixed on the surface of the light path side of the base plate 21 by threadably mounting two screws 39 and 40 on screw holes 21q and 21r (refer to FIG. 8). A printed circuit board 41 is installed to the photoelectric sensors 37 and 38.

In FIG. 9, only a portion of two photoelectric sensors 37 and 38 can be seen due to being hidden by the print circuit board 41. On the other hand, in FIG. 7, one photoelectric sensor 37 is shown. The photoelectric sensors 37 and 38 have a light emitting section and a light receiving section and can detect the rotational position of the main operation member 23 when the to-be-detected portions 23f and 23g intercept the light entering the light receiving section. The photoelectric sensor 37 is configured so as to sense the fully opened state of the light path caused by the four divided blades 28, 29, 30 and 31 by detecting the to-be-detected portion 23f. The photoelectric sensor 38 is configured so as to sense the intercepted state of the light path caused by the four divided blades 28, 29, 30 and 31 by detecting the to-be-detected portion 23g.

As shown in FIG. 5, a cover member 42 is installed on the base plate 21. The cover member 42 is made of synthetic resin and is secured to the base plate 21 using screws 43 and 44 by adjusting two cylinder portions (one of the cylinder portion 42a) to above described screw holes 21f and 21g formed in the base plate 21. Holes 42b and 42c for fitting the end of the above described main shafts 21h and 21i, holes 42d and 42e for fitting the end of the above described sub shafts 21j and 21k, and a square hole 42f are formed in the cover member 42. Spring hook portions 42g and 42h are installed on the surface of the base plate 21 side. A hook portion 42i is formed from an edge of the hole 42f to the base plate 21 side and the end of the hook portion 42i is hooked to the edge of a square hole 21t (refer to FIG. 8 and FIG. 9) formed in the base plate 21.

Further, a coil spring 45 is wound around the main shaft 21h, one end of the coil spring 45 is hooked to the spring hook portion 22a of the main operation member 22 and another end is hooked to the spring hook portion 42g of the cover member 42. In addition, a coil spring 46 is wound around the main shaft 21i, one end of the coil spring 46 is hooked to the spring hook portion 23a of the main operation member 23 and another end is hooked to the spring hook portion 42h of the cover member 42. The coil springs 45 and 46 are installed such that the main operation members 22 and 23 prevent the main shafts 21h and 21i from shaking in the axis direction and backlashes between the gear portion 22b and the gear portion 23b and between the gear portion 23e and the gear 35a are removed.

Note that, in the present embodiment, the main shafts 21h and 21i and the sub shafts 21j and 21k are vertically arranged on the plate surface opposite to the light path side of the base plate 21. The main operation members 22 and 23 and the sub operation members 24 and 25 are installed to the main shafts 21h and 21i and the sub shafts 21j and 21k respectively. However, the present invention is not limited to this structure. The main shafts 21h and 21i and the sub shafts 21j and 21k may be vertically arranged on the plate surface of the light path side of the base plate 21. The main operation members 22 and 23, the sub operation members 24 and 25 and link members 26 and 27 may be arranged on the light path side of the base plate 21. This also applies to each of the following embodiments.

Subsequently, the function of the present embodiment will be explained. FIGS. 5-9 show the state in which the light path of the light from the light source is intercepted. In the present embodiment, in this state, the lamp is turned on. However, since this state is in the time when no image is projected on the screen, the light path is temporarily intercepted by the 4 divided blades 28-31. Therefore, the screen is dark.

When projection is started, the stepping motor 35 is energized to rotate the gear 35a that is installed to the output shaft. Therefore, in FIG. 8, the main operation member 23 is rotated counterclockwise and the main operation member 22 is rotated clockwise.

Figure 10:
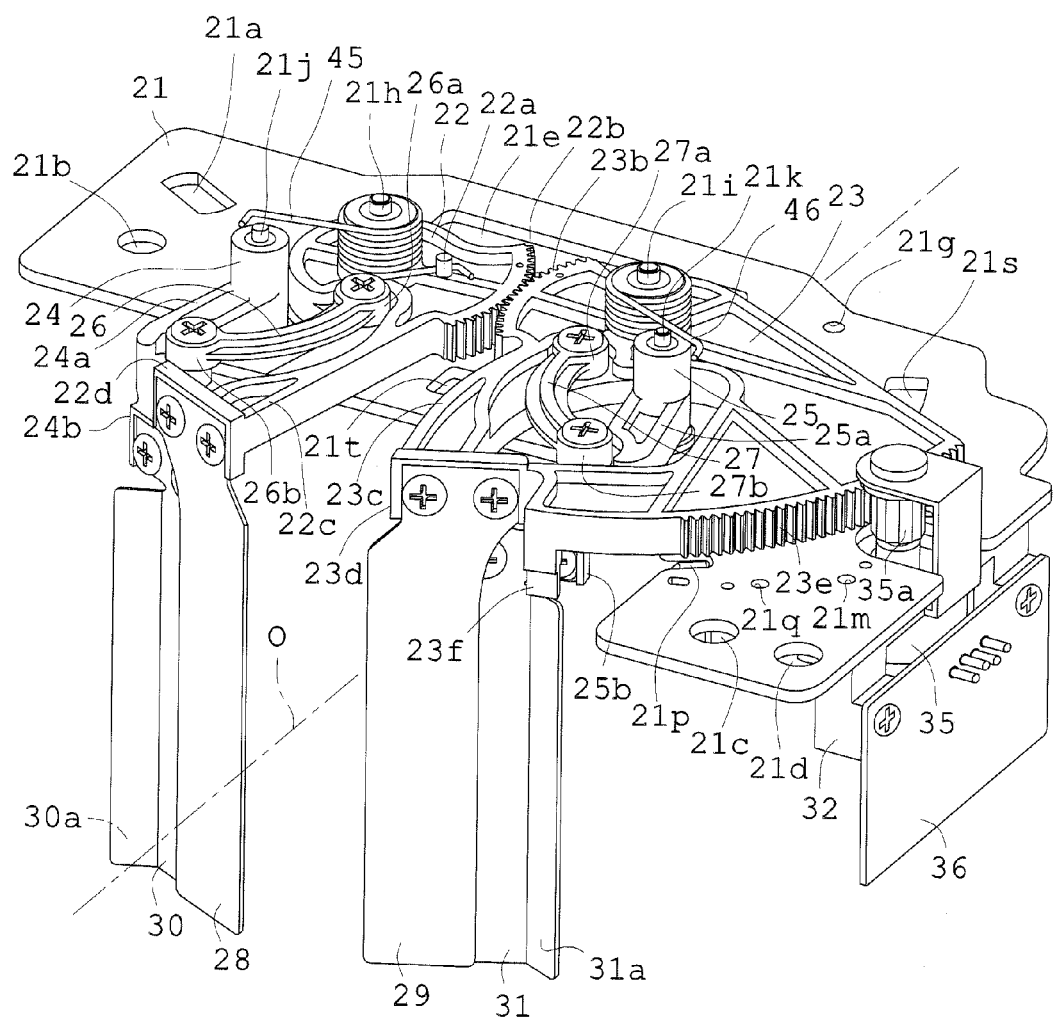
FIG. 10 is a perspective view of the second embodiment showing a state in which two sets of intercepting blades partially open the light path in the similar manner as FIG. 6.
Figure 11:
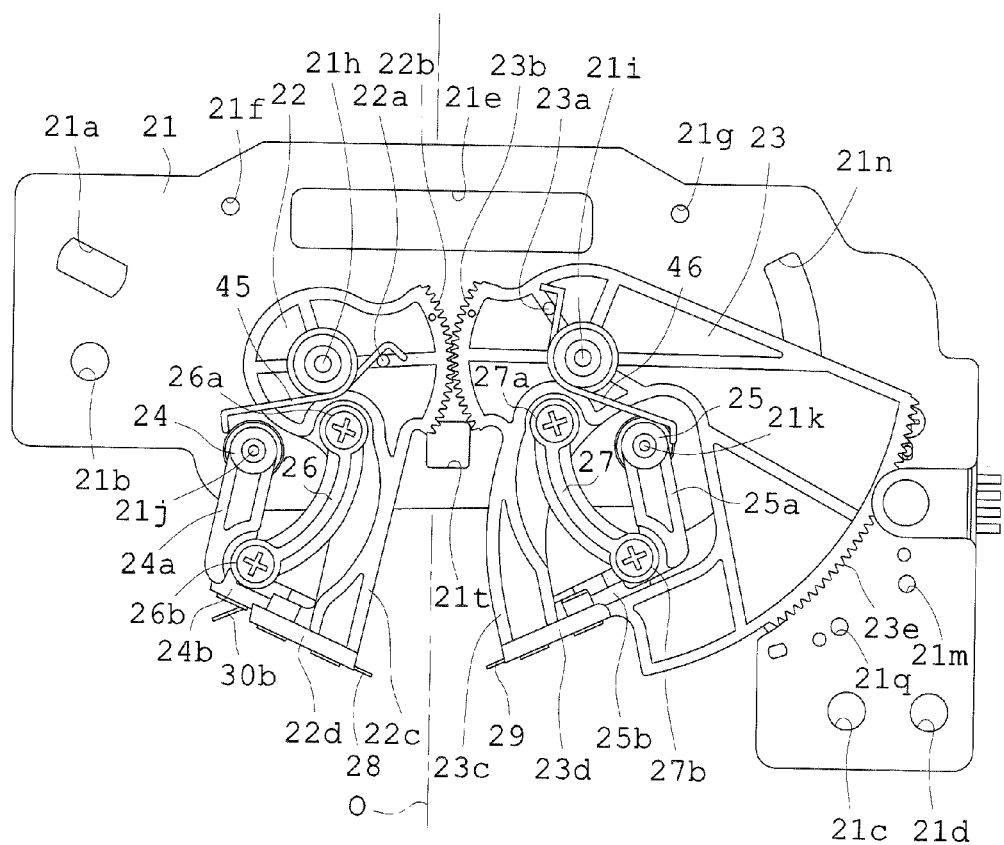
FIG. 11 is a top view showing a state of FIG. 10 in the similar manner as FIG. 8.

Then, the main operation member 22 rotates the sub operation member 24 clockwise via the link member 26 and the main operation member 22 rotates the sub operation member 25 counterclockwise via the link member 27. However, since the distances from the main shafts 21h and 21i to the end portions 26a and 27a of the link members 26 and 27 are shorter than the distances from the sub shafts 21j and 21k to another end portions 26b and 27b of the link members 26 and 27, the rotation speed of the sub operation members 24 and 25 are slower than the rotation speed of the main operation members 22 and 23. Therefore, while the superposed area of the main divided blade 28 and the sub divided blade 30 is being increased, the main divided blade 28 and the sub divided blade 30 moves along a circular track clockwise. While the superposed area of the main divided blade 29 and the sub divided blade 31 is being increased, the main divided blade 29 and the sub divided blade 31 moves along a circular track counterclockwise. FIGS. 10 and 11 thus show the state in which two sets of intercepting blades partially open the light path and stop at predetermined light intensity control positions.

When illumination light intensity by the light from the light source is intensified from the state shown in FIGS. 10 and 11, the stepping motor 35 is rotated in the same direction thus far until the predetermined light intensity is acquired. When illumination light intensity by the light from the light source is decreased, the stepping motor 35 is rotated in the reverse direction until the predetermined light intensity is acquired.

FIGS. 12 and 13 show a state in which the light path is fully opened in order to increase the illumination light intensity by the light from the light source. The sub divided blades 30 and 31 of the present embodiment form the bended portions 30a and 31a. Because, in this state, the surfaces of the bended portions 30a and 31a are arranged perpendicular to the center axis O of the light path such that the sub divided blades 30 and 31 do not interfere with the member (for example, the frame body on which a fly eye lens is installed) of the project body (not shown) arranged on the backside. In the present embodiment, the space in the projector is efficiently utilized by making two intercepting blades be composed of the main divided blades 28 and 29 and the sub divided blades 30 and 31 with these ingenuities.

Note that, as shown in FIGS. 5-9, the diaphragm apparatus of the present embodiment can intercept the light path by the four divided blades 28-31. However, the present invention is not limited to this structure. For example, the counterclockwise rotation of the main operation member 22 and the clockwise rotation of the main operation member 23 may be limited up to the position where a long and narrow space (slit) between the main divided member 28 and the main divided member 29 is formed. Therefore, in such a case, the structure in which the main divided blades 28 and 29 can be partially superposed is not needed as the present embodiment. This also applies to the following embodiments 3-5.

In addition, in the present embodiment, driving means is the stepping motor 35. However, the electromagnetic actuator of the present invention is not limited to stepping motors and may be various types of reciprocally movable motors. This also applies to the following embodiments 3-5.

Further in the present embodiment, the main operation member 22 and 23 are rotatably installed with regard to the main shafts 21h and 21i that are vertically arranged on the base plate 21, and the sub operation member 24 and 25 are rotatably installed with regard to the sub shafts 21j and 21k that are vertically arranged on the base plate 21. However, the installation structure of each operation member 22-25 with regard to the base plate 21 is not limited to these structures. For example, at least one of these operation members 22-25 may form a shaft at a rotation center and may rotatably fit the shaft in a hole formed in the base plate 21. This also applies to the following embodiments 3-5.

Third Embodiment

Subsequently, the third embodiment will be explained with reference to FIGS. 14 and 15. The diaphragm apparatus for projectors of the present embodiment, similar to the second embodiment, is a diaphragm apparatus for projectors in which two sets of intercepting blades composed of each of two divided blades are reciprocally moved simultaneously in the opposite directions by a single electromagnetic actuator. FIG. 14 is a perspective view showing, in the similar manner as FIG. 6, a state in which two sets of intercepting blades intercept the light path. FIG. 15 is a perspective view showing a fully opened state of the light path by two sets of intercepting blades in the similar manner as FIG. 12.

The structure of the present embodiment is different from the second embodiment which has different connection mechanism of the main operation member 22 and the main operation member 23. Therefore, in the FIGS. 14 and 15, the structure members same as the second embodiment are denoted by the same reference signs and their explanation is omitted. Also, although a few portions of the main operation member 22 and the main operation member 23 have different shapes compared with the second embodiment, the same reference signs are used since almost all portions have same shapes. Therefore, only the point different from the second embodiment will be explained.

The main operation members 22 and 23 do not have gear portions 22b and 23b not like the main operation members 22 and 23 of the second embodiment. In addition, in the present embodiment, coil springs 45 and 46 in the second embodiment are not provided. Therefore, the main operation members 22 and 23 do not have spring hook portions 22a and 23a formed on the main operation member 22 and 23 of the second embodiment. Also, the spring hook portions 42g and 42h explained in the second embodiment are not installed on the cover member 42 (not shown).

In the present embodiment, a link member 47 is newly provided and whose end 47a is rotatably installed on the main operation member 22 and another end 47b is rotatably installed on the main operation member 23. Other structures are the same as the second embodiment.

Since the present embodiment is thus configured, when one of the main operation members 23 is rotated counterclockwise by the stepping motor 35 from the state shown in FIG. 14, another main operation member 22 is rotated clockwise via the link member 47. In addition, when the main operation member 23 is rotated clockwise by the stepping motor 35 from the state shown in FIG. 15, the main operation member 22 is rotated counterclockwise via the link member 47. Other detailed function explanation is omitted since description is the same as the second embodiment.

Note that, in the present embodiment, two main operation members 22 and 23 are connected with the link member 47 to rotate the two main operation members 22 and 23 by a single stepping motor 35 in the opposite directions. In addition, in the above second embodiment, the gear portions 22b and 23b of the two main operation members 22 and 23 are engaged from the same reason. However, for example, even if the main operation members 22 and 23 are partially superposed, a pin is fitted in the long holes formed in the superposed portion, and the pin is reciprocally moved by the motor, the main operation members 22 and 23 can be rotated simultaneously in the opposite directions. Therefore, the structure in which two main operation members 22 and 23 are rotated by a single stepping motor 35 in the opposite directions is not limited to the structures of the second, third and the below described fifth embodiments.

Fourth Embodiment

Subsequently, the fourth embodiment will be explained with reference to FIGS. 16-18. Similar to the above described second and third embodiments, the diaphragm apparatus for projectors of the present embodiment is provided with two sets of intercepting blades composed of each of two divided blades and are reciprocally moved simultaneously in the opposite directions by each of electromagnetic actuators, not by a single electromagnetic actuator.

FIG. 16 is a perspective view showing a state in which two sets of intercepting blades composed of two respective divided blades control the minimum light path. FIG. 17 is a perspective view showing a state in which outer shapes of cover members and two electromagnetic actuators shown in FIG. 16 are indicated by two-dot chain lines and only rotors of the two electromagnetic actuators are indicated by solid lines. FIG. 18 is a perspective view that shows a fully opened state of the light path with two-dot chain lines being removed from FIG. 17.

In addition, since the same reference signs are denoted for the same constituent members as in the second and third embodiments in FIGS. 16-18, their explanation is omitted. In addition, since two electromagnetic actuators are provided in the present embodiment, the shapes of the base plate 21 and the cover member 42 are partially different from the cases of second and third embodiments. Also, since two main operation members 22 and 23 are not mutually connected as in the cases of second and third embodiments, their shapes are partially different. Further, the shapes of the main divided blades 28 and 29 are partially different from the cases of second and third embodiments. However, since only portions of shapes are different, the same reference signs are used as in the cases of second and third embodiments.

Therefore, with regard to the structure of the present embodiment, the points that are different from the second and third embodiments will be explained. The base plate 21 of the present embodiment has a simpler shape than the base plate 21 of the second and third embodiments, since the stepping motor 35 and the photoelectric sensors 37 and 38 are not mounted. Similar to the cases of the second and third embodiments, four holes 21a-21d for installing the base plate 21 to the projector body, a long hole 21e for releasing hot air upward, two screw holes 21f and 21g for installing the cover member, and a hole 21t for hooking the hook portion 42i of the cover member 42 are formed. Among them, the formed locations of the holes 21c and 21d are greatly changed, since the outer shape of the base plate 21 is changed.

Since the main operation members 22 and 23 of the present embodiment are reciprocally rotated by each electromagnetic actuator, the main operation members 22 and 23 do not have gear portions 22b, 23b, and 23e as the second embodiment. Also, the main operation member 23 does not have the gear portion 23e and the main operation members 22 and 23 are not connected with the link member 47 as the third embodiment. Alternatively, pins 22e and 23h are installed on the main operation members 22 and 23. Other shapes are the same as the main operation members 22 and 23 of the second embodiment. Therefore, in the present embodiment, coil springs 45 and 46 are not provided as in the second embodiment.

Cut portions 28a and 29a are formed on the main divided blades 28 and 29. As shown in FIGS. 16 and 17, a minimum light path area is adapted to be formed to surround the centerline O of the light path, when the areas along the end edge of incoming side of the light path of main divided blades 28 and 29 are superposed each other. Therefore, in the case of the present embodiment, the light path is never intercepted as the above described second and third embodiments.

However, cut portions 28a and 29a in the present invention are not formed at the main divided blades 28 and 29, which may be configured to be able to intercept the light path as the above described second and third embodiments. Also, similar to the present embodiment, cut portions 28a and 29a at the main divided blades 28 and 29 of the above described second and third embodiments may be adapted to form a minimum light path area. Further, the shapes of cutting portions 28a and 29a are not limited to the shapes of the present embodiment shown. This also applies to the fifth embodiment below.

Similar to the cover member 42 of the second embodiment shown in FIG. 5, the cover member 42 of the present embodiment is installed on the base plate 21 by two screws 43 and 44. Holes 42b and 42c for inserting the end of the main shafts 21h and 21i, and holes 42d and 42e for inserting the end of the sub shafts 21j and 21k are formed in the cover member 42 of the present embodiment. The holes 42b and 42c are not clearly shown in FIG. 16. In addition, the spring hook portions 42g and 42h shown in FIG. 5 are not formed on the cover member 42 in the present embodiment.

In the present embodiment, two electromagnetic actuators are installed to the cover member 42. The electromagnetic actuator of the present embodiment is, for example, current control type motors 48 and 49 such as the one described in the Japanese Unexamined Patent Application Publication No. 2005-241726. The rotors 48a and 49a shown in FIGS. 17 and 18 have cylindrical body portions 48a-1 and 49a-1 having dipole permanent magnets and arm portions 48a-2 and 49a-2 made of synthetic resin extruding in radial directions. Long holes 48a-3 and 49a-3 are formed at the end of the arm portions 48a-2 and 49a-2.

The stator of the motor 48 is composed of a first stator frame 50 accommodating bearings of a rotation shaft of the rotor 48a, a second stator frame 51 accommodating bearings of another rotation shaft of the rotor 48a, two coils 52 and 53 sequentially superposed and wound to surround the bearing portions of the stator frames 50 and 51, a cylindrical yoke 54 arranged the inserted state from outside of the coil 53 to the first stator frame 50 and a hall element (not shown) installed to the first stator frame 50 and facing the perimeter surface of the body portion 48a-1 of the rotor 48a.

The stator of the motor 49 is composed of a first stator frame 55 accommodating bearings of a rotation shaft of the rotor 49a, a second stator frame 51 accommodating bearings of another rotation shaft of the rotor 49a, two coils 56 and 57 sequentially superposed and wound to surround the bearing portions of the stator frames 55 and 51, a cylindrical yoke 58 arranged the inserted state from outside of the coil 57 to the first stator frame 55 and a hall element (not shown) installed to the first stator frame 55 and facing the perimeter surface of the body portion 49a-1 of the rotor 49a.

In FIG. 16, among each of a plurality of terminals installed on the top surface of the first stator frames, two sets of terminals are terminals for the two coils and four terminals in a row are terminals for hall elements.

In the case of the present embodiment, the second stator frame 51 is secured to the cover member 42 by two screws 59 and 60. In the installed state, the rotation shafts of the rotors 48a and 49a are coaxially arranged with the main shafts 21h and 21i. Also in the installed state, the above described pins 22e and 23h of the main operation members 22 and 23 pierce through long holes 21u and 21v of base plate 21 shown in FIG. 16, through long holes 51a and 51b of the second stator frame 51 formed to be superposed thereon, and fit in the log holes 48a-3 and 49a-3 of the rotors 48a and 49a.

Note that the second stator frame 51 of the present embodiment is manufactured a second stator frame of the motor 48 and a second stator frame of the motor 49 as one part. However, in the present invention, the second stator frame 51 may be manufactured as separate second stator frames for each motor 48 and 49. In addition, in the present embodiment, the long holes 48a-3 and 49a-3 are made in the rotors 48a and 49a and the pins 22e and 23h are installed on the main operation members 22 and 23. But pins may be built at the rotors 48a and 49a and long holes may be made in the main operation members 22 and 23.

Thus-configured motors 48 and 49, as well known, are adapted to rotate the rotors 48a and 49a in one direction when coils 52 and 56 on one side are energized and to rotate the rotors 48a and 49a in another direction when coils 53 and 57 on the other side are energized. The rotors 48a and 49a are structured to stop at a balanced position of both rotation forces. Also, the rotation positions of the rotors 48a and 49a are continuously detected by the hall elements (not shown). The current values for the respective two coils are adapted to be controlled by the detection signal of the hall element to rotate the rotors 48a and 49a in a predetermined direction and to stop at a predetermined position.

However, among the current control type motors, there is a type of motor known which is configured such that only one coil, not two, is installed in a motor not like the present embodiment, and current values are controlled while the rotation position of the rotors are detected by the hall element similar to the present embodiment to stop the rotors at a predetermined position. For that purpose, in the present invention, the current control type motors 48 and 49 of the present embodiment may be thus-structured motors.

Next, function of the present embodiment will be explained briefly. FIGS. 16 and 17 show states in which the light source lamp is turned on but no images are projected on the screen. Then, the light path of rectangular minimum sectional area is formed to surround the centerline O of the light path by the cut portions 28a and 29a of two main divided blades 28 and 29 in the present embodiment. Therefore, the screen is dim.

When projection is started in this state, each predetermined current is supplied simultaneously to the coils 52 and 53 of the motor 48 and to the coils 56 and 57 of the motor 49. Therefore, the rotor 48a is rotated clockwise and the rotor 49a is rotated counterclockwise. Therefore, the main operation member 22 is rotated clockwise and the main operation member 23 is rotated counterclockwise. When the main operation members 22 and 23 are rotated in the opposite directions by the same angle to reach predetermined positions, the rotational force given by the coils 52 and 53 is balanced and the rotational force given by the coils 56 and 57 is balanced. The rotors 48a and 49a are stopped and a predetermined size of light path is formed between the main operation blades 28 and 29.

Then, corresponding to the image condition, the main operation members 22 and 23 are rotated in the opposite directions by the same angle for each time during projection and the intensity of the illumination light is controlled. FIG. 18 shows the fully opened state of the light path. After the projection completed, the rotor 48a is rotated counterclockwise, the rotor 49a is rotated clockwise and the rotors 48a and 49a are returned to the state of FIGS. 16 and 17 forcibly.

Note that the current control type motors 48 and 49 are used as electromagnetic actuators in the present embodiment. In place of these motors, a stepping motor having a structure different from the stepping motors 8 and 35 that are used in the above described respective embodiment may be used.

Fifth Embodiment

Subsequently, the fifth embodiment will be explained with reference to FIGS. 19-27. The present embodiment is, similar to the above described third embodiments, a diaphragm apparatus for projectors in which two main operation members are mutually linked by a link member but no gear portion is formed on the main operation members. The driving force of electromagnetic actuators is configured to transmit to one of the main operation member via another link member.

Figure 19:
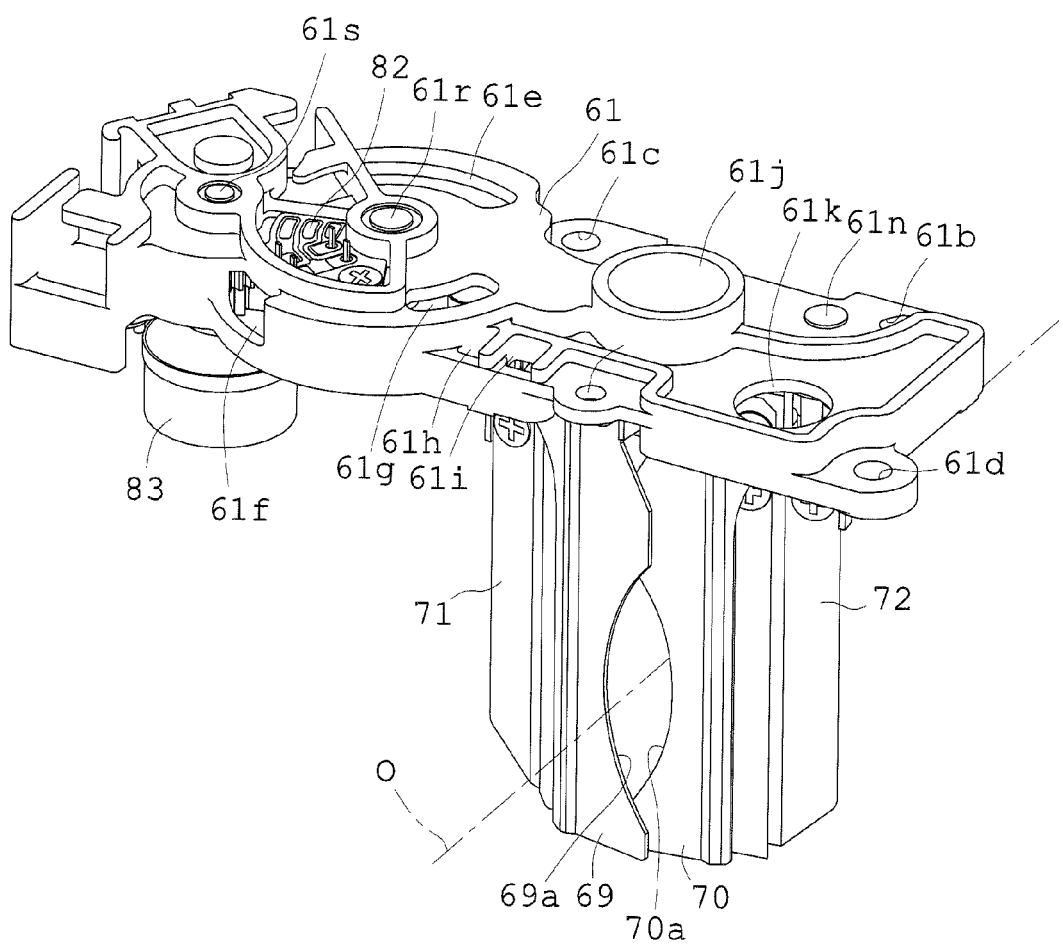
FIG. 19 is a perspective view of a fifth embodiment showing a state in which two sets of intercepting blades composed of two respective divided blades control the minimum diaphragm aperture.
Figure 20:
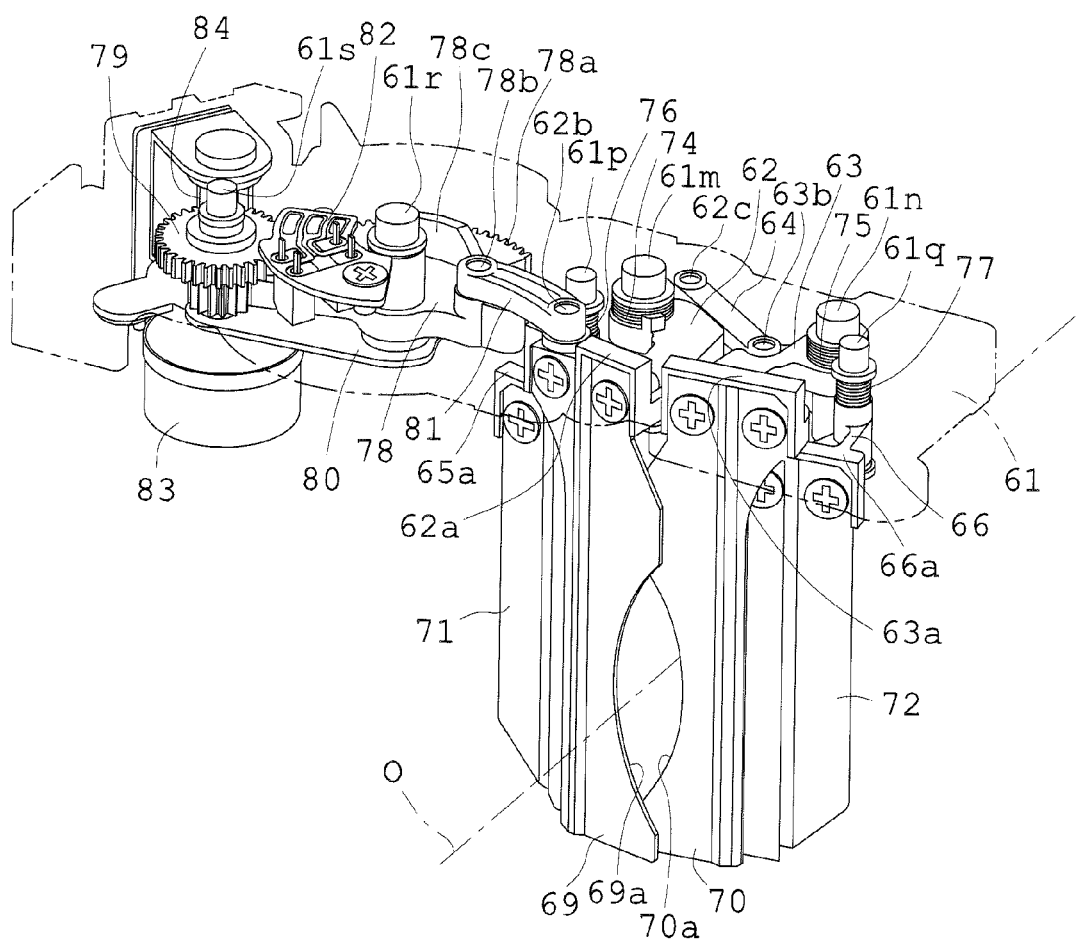
FIG. 20 is a perspective view showing a state of FIG. 19 in which the base plate is removed and an outer shape of the removed base plate is indicated by a two-dot chain line.
Figure 21:
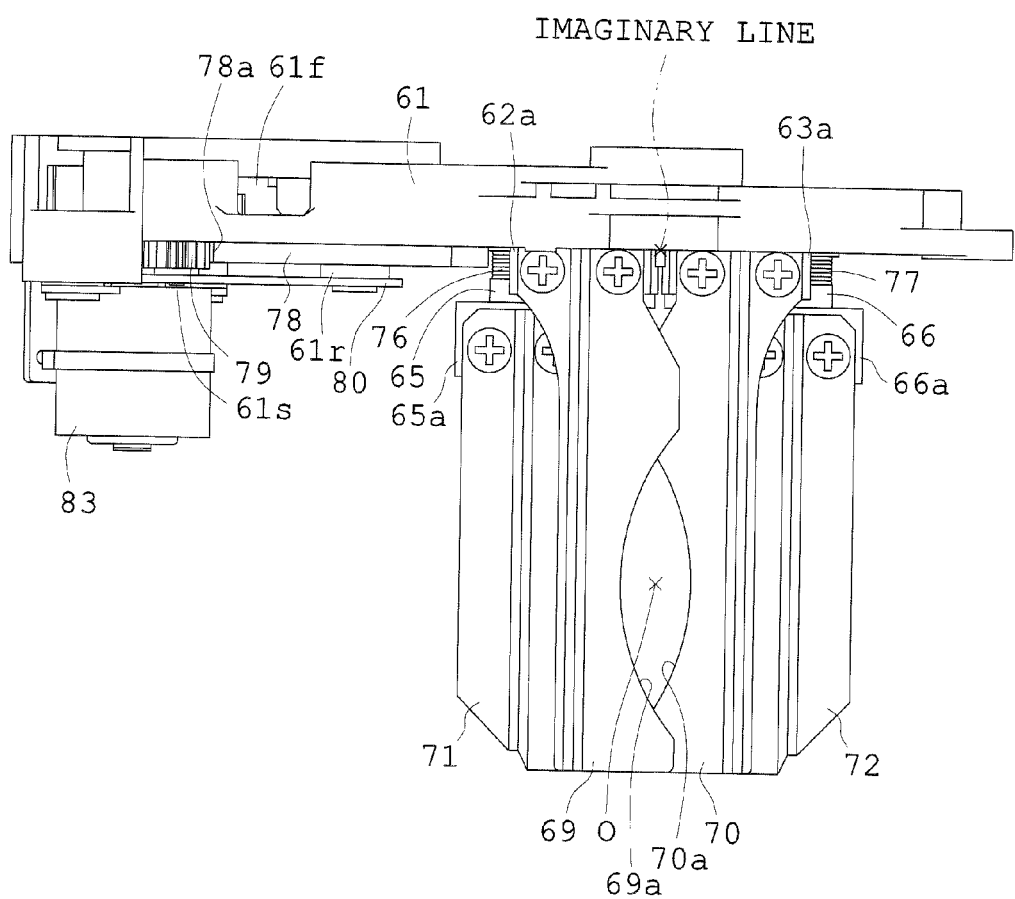
FIG. 21 is an elevation showing the same state as FIG. 19.
Figure 22:
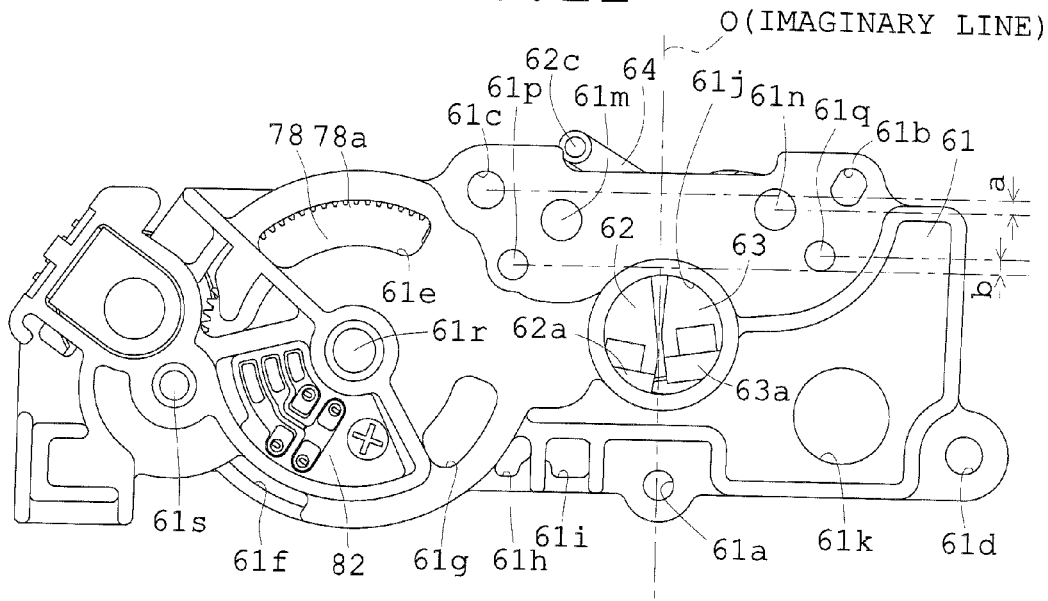
FIG. 22 is a top view of FIG. 21.
Figure 23:
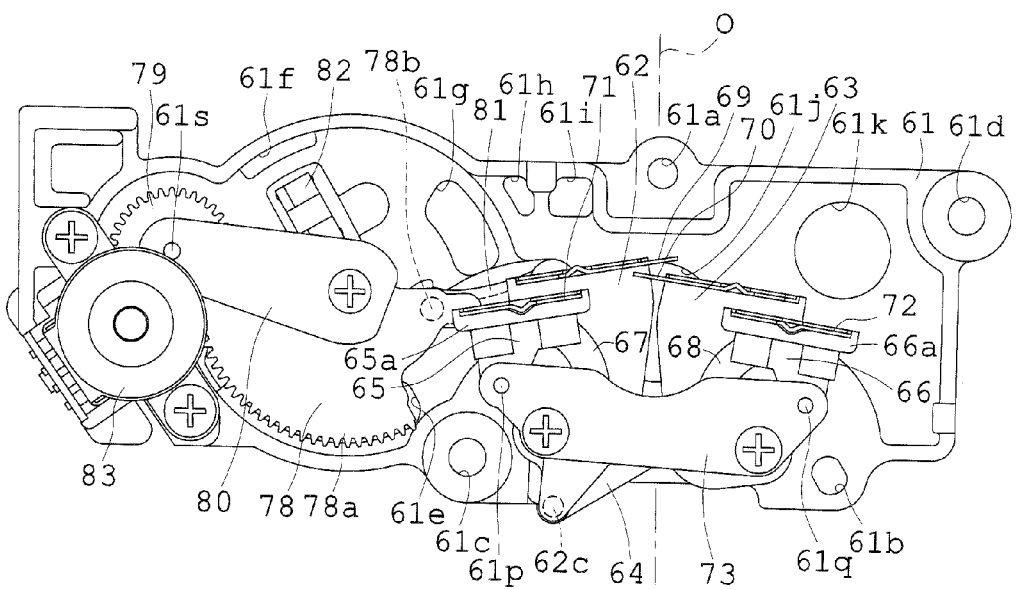
FIG. 23 is a bottom view of FIG. 21.
Figure 24:
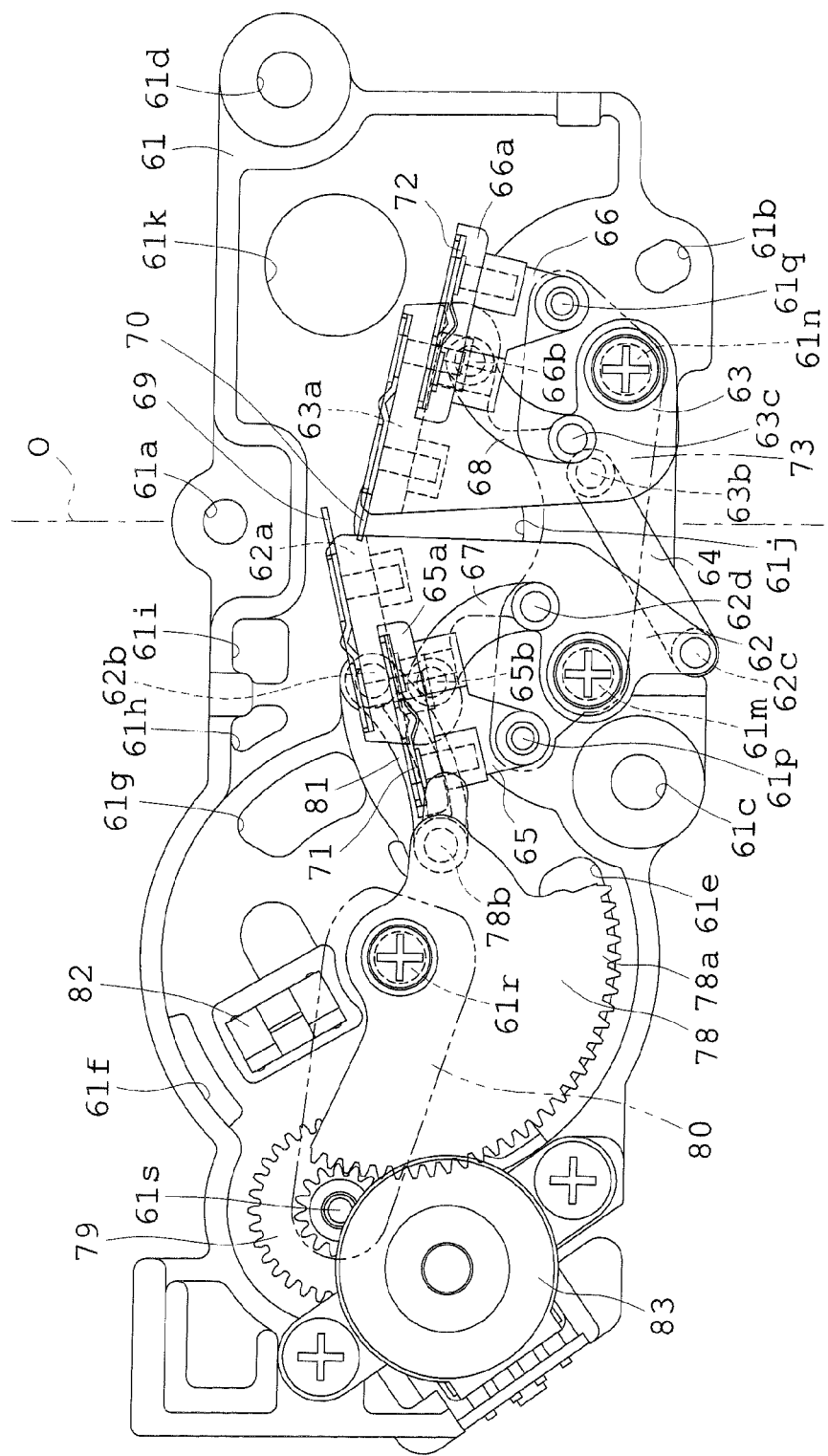
FIG. 24 is a bottom view showing outer shapes of two retainer plates shown in FIG. 23 by two-dot chain lines.

First, the structure of the present embodiment will be explained with reference to FIGS. 19-24. Note that, as described above, FIG. 19 is a perspective view showing a state in which two intercepting blades composed of two respective divided blades form a minimum light path. FIG. 20 is a perspective view showing a state of FIG. 19 in which the base plate is removed and an outer shape of the removed base plate is indicated by a two-dot chain line. FIG. 21 is an elevation showing the same state as FIG. 19. FIG. 22 is a top view of FIG. 21. FIG. 23 is a bottom view of FIG. 21. FIG. 24 is a bottom view showing outer shapes of two retainer plates shown in FIG. 23 by two-dot chain lines.

The base plate 61 of the present embodiment is made of synthetic resin and a plurality of holes are formed therethrough, and a plurality of reinforcing ribs and a plurality of mounting portions for installing various members are formed on both sides. The entire base plate 61 has a complex shape. As clearly shown in FIGS. 22-24, four holes 61a, 61b, 61c and 61d necessary for assembling the projector body (not shown) are formed in the base plate 61. Among them, two holes 61a and 61b are formed for fitting positioning pins (not shown) and another two holes 61c and 61d are formed for inserting screws (not shown) to secure the base plate 61 to the projector body.

As shown in FIG. 19, FIG. 20, and FIGS. 22-24, the centerline of the light path is indicated by a one-dot chain line and denoted by "O" also in the present embodiment. In addition, in FIG. 21, the position of the centerline of the light path is denoted by "x". Thus, also in the present embodiment, the base plate 61 is arranged at the upper position of the light path with one of its plate face on the light path side in the projector. Therefore, when heat stays in the lower portion of the base plate 61, each member made of synthetic resin installed on the light path side of the base plate 61 (will be described later) may be transformed and the heat may affect the performance of the stepping motor. Therefore, also in the present embodiment, holes 61e, 61f, 61g, 61h, 61i, 61j and 61k of various shapes are formed in the base plate 61 to release the heat of the light path side upward as possible. Also some of the holes are used for installing the later described members to the base plate 61 and for checking the condition of installation.

Two main shafts 61m and 61n and two sub shafts 61p and 61q made of metal are vertically arranged on the plate surface on the light path side on the base plate 61. In the present embodiment, the main shafts 61m and 61n are vertically arranged on both sides of an imaginary line (a line drawn adapted to be superposed with the center line O of the light path with regard to the base plate 61 in FIG. 22) which is closest and parallel to the center line O of the light path at a position substantially equally spaced from the imaginary line on the base plate 21. Also, the sub shafts 61p and 61q are vertically arranged likewise at a position substantially equally spaced from the imaginary line. The distance between the sub shafts is larger than the distance between the main shafts 61m and 61n.

Also, in the present embodiment, the main shafts 61m and 61n are not vertically arranged on the same predetermined line that is perpendicular to the above described imaginary line. As can be seen from FIG. 22, their shaft centers are vertically arranged at positions displaced by the predetermined interval "a" each other in the direction along the light path (up and down direction). Therefore, in other words, it may be said that the main shafts 61m and 61n are vertically arranged on both sides of the determined line that is perpendicular to the above described imaginary line. In addition, the sub shafts 61p and 61q likewise are not vertically arranged on the same predetermined line that is perpendicular to the above described imaginary line. As shown in FIG. 22, they are vertically arranged at positions displaced by the interval "b" each other in the same direction along the light path with regard to the main shafts 61m and 61n respectively. The direction of the displacement is the same as the main shafts 61m and 61n and the shift length is substantially the same (a=b).

Main operation members 62 and 63 made of synthetic resin are rotatably installed on the main shafts 61m and 61n. As shown in FIG. 24, the main operation member 62 forms a mounting portion 62a at the most distant position from the main shaft 61m and forms a mounting shaft 62b at a portion of 62a. The main operation member 62 forms a mounting shaft 62c and a mounting shaft 62d in the vicinity of the main shaft 61m. Another main operation member 63 forms a mounting portion 63a at the most distant position from the main shaft 61n, forms a mounting shaft 63b in the vicinity of the main shaft 61 and a mounting portion 63c on the light path side. The respective mounting portions 62c and 63b of these main operation members 62 and 63 rotatably fit in the holes formed at both ends of a link member 64 that is made of synthetic resin.

In the present embodiment, the main operation members 62 and 63 made of synthetic resin are installed on the surface of the light side path of the base plate 61. Therefore, when the two main operation members are not configured to be connected with the link member 64 as the present embodiment but to be connected with the gear portions formed thereon, the teeth shapes of the gear portions may be transformed by high heat. However, in the present embodiment, there will not be such a problem since they are connected with the link member 64.

As shown in FIG. 24, sub operation members 64 and 65 made of synthetic resin are rotatably installed to the sub shafts 61p and 61q. The sub operation members 65 and 66 form mounting portions 65a and 66a at the most distant positions from the sub shafts 61p and 61q on the light path side and form mounting shafts 65b and 66b on the side of the base plate 61, that is, on the sides of the main operation members 62 and 63. In addition, the mounting shaft 65b of the sub operation member 65 and the mounting shaft 62d of the above described main operation member 62 rotatably fit in the holes formed at both ends of a link member 67 made of synthetic resin respectively. The mounting shaft 66b of the sub operation member 66 and the mounting shaft 63c of the above described main operation member 63 rotatably fit in the holes formed at both ends of a link member 68 made of synthetic resin respectively.

Thus, the main operation member 62 and the sub operation member 65 are linked with the link member 67 and the main operation member 63 and the sub operation member 66 are linked with the link member 68. The link structure is such that the distance from the sub shaft 61p to the mounting shaft 65b is configured to be longer than the distance from the main shaft 61*m* to the mounting shaft 62*d* and the distance from the sub shaft 61*q* to the mounting shaft 66*b* is configured to be longer than the distance from the main shaft 61*n* to the mounting shaft 63*c*. Furthermore, the distance from the main shaft 61*m* to the mounting shaft 62*d* is configured to be the same as the distance from the main shaft 61*n* to the mounting shaft 63*c*. The distance from the sub shaft 61*p* to the mounting shaft 65*b* is configured to be the same as the distance from the sub shaft 61*q* to the mounting shaft 66*b*. The distance from the mounting shaft 62*d* to the mounting shaft 65*b* is configured to be the same as the distance from the mounting shaft 63*c* to the mounting shaft 66*b*.

Then, the distance from the main shaft 61*m* to the center of the mounting portion 62*a* is the same as the distance from the main shaft 61*n* to the center of the mounting portion 63*a*. The distance from the sub shaft 61*p* to the center of the mounting portion 65*b* is the same as the distance from the sub shaft 61*q* to the center of the mounting portion 66*a*. As can be seen from in FIG. 24, the mounting portions 65*a* and 66*a* of the sub operation member 65 and 66 is configured to be arranged closer to the main shafts 61*m* and 61*n* than the mounting portions 62*a* and 63*a* of the main operation members 62 and 63.

As can be seen from FIGS. 20 and 21, a main divided blade 69 made of metal is installed to be perpendicular to the plate surface of the base plate 61 to the mounting portion 62*a* of the main operation member 62 by two screws. A main divided blade 70 made of metal is installed to be perpendicular to the plate surface of the base plate 61 to the mounting portion 63*a* of the main operation member 63 by two screws.

The main divided blades 69 and 70 of the present embodiment is very thinly formed. Therefore, in FIG. 21, a portion linearly bended from the top end to the bottom end is formed on the main divided blades 69 and 70 to prevent the lower free end portion from bending. In addition, the main divided blades 69 and 70 form cut portions 69*a* and 70*a* whose edges are circular in order not to completely intercept the light path. However, in the present invention, the bended portion as described above are not necessarily formed on the main divided blades 69 and 70, and the cut portions 69*a* and 70*a* are not necessarily formed. Even if when the cut portions 69*a* and 70*a* are formed, the edge shape is not limited to be circular and may be the same shape as the cut portions 28*a* and 29*a* in the fourth embodiment or may be other shapes.

Note that, in the present embodiment, since the vertically arranged positions of the main shafts 61*m* ad 61*n* are mutually displaced along the light path direction and the distances from the main shafts 61*m* and 61*n* to each of the center portion of the mounting portions 62*a* and 63*a* are same, the main divided blades 69 and 70 do not interfere and the state shown in FIG. 24 can be acquired. However, an equivalent state as shown in FIG. 24 can be acquired with a structure other than the above described.

That is, the structure is such that the main shafts 61*m* and 61*n* are vertically arranged on the same line at right angles to the above described imaginary line on the base plate 61; the distance from the main shaft 61*n* to the center of the mounting portion 63*a* is configured to be shorter than the distance from the main shaft 61*m* to the center portion of the mounting portion 62*a*; the sub shafts 61*p* and 61*q* are vertically arranged on the same line at right angles to the above described imaginary line on the base plate 61; and the distance from the sub shaft 61*q* to the center portion of the mounting portion 66*b* is configured to be shorter than the distance from the sub shaft 61*p* to the center of the mounting portion 65*b*. Therefore, thus-configured structure is a diaphragm apparatus for projectors of the present invention.

A sub divided blade 71 made of metal is installed to be perpendicular to the plate surface of the base plate 61 to the mounting portion 65*a* of the sub operation member 65 by two screws. A sub divided blade 72 made of metal is installed to be perpendicular to the plate surface of the base plate 61 to the mounting portion 66*a* of the sub operation member 66 by two screws. Bended portions having similar shapes are formed on the sub divided blades 71 and 72 due to the same reason as the above described main blades 69 and 70.

A retainer plate 73 made of metal is mounted on the end of the main shafts 61*m* and 61*n*. The retainer plate is indicated by a solid line in FIG. 23 and by a two-dot chain line in FIG. 24. That is, the retainer plate 73 is threadably mounted on the screw holes formed in the end of the main shafts 61*m* and 61*n* by inserting small diameter portions formed on the end of the sub shafts 61*p* and 61*q* into two small holes and inserting two screws in two large holes. Therefore, the main operation members 62 and 63 are prevented from coming out from the main shafts 61*m* and 61*n* and the sub operation members 65 and 66 are prevented from coming out from the sub shafts 61*p* and 61*q*.

As clearly shown in FIG. 20, Coil springs 74, 75, 76 and 77 having relatively weak energizing force are wound around each of the main shafts 61*m* and 61*n* and sub shafts 61*p* and 61*q*. The coil spring 75 applies energizing force to the main operation member 63 in the rotational direction and at the same time in the axial direction of the main shaft 61*n*. The coil springs 74, 76 and 77 apply energizing forces to the main operation member 62 and sub operation members 65 and 66 only in the axial direction of each shaft 61*m*, 61*p* and 61*q*. Therefore, shakes in the radial direction of each shaft 61*m*, 61*n*, 61*p* and 61*q* are prevented on the main operation members 62 and 63 and sub operation members 65 and 66 by the energizing force of the coil spring 75 and shakes in the axial direction of each shaft 61*m*, 61*n*, 61*p* and 61*q* are prevented by the energizing forces of the coil springs 74, 75, 76 and 77. Therefore, the relative positional relationships of the divided blades 69, 70, 71 and 72 become stable while in operation as well as in a stopped state.

Note that, in the present embodiment, the coil spring 75 is configured to apply energizing force to the main operation member 63 in the rotational direction and at the same time in the axial direction of the main shaft 61*n*. The same effect can be acquired by the energizing energy given by any one of the coil springs 74, 76 and 77 instead of being given by the coil spring 75.

Shafts 61*r* and 61*s* made of metal are vertically arranged on the face of the light path side of the base plate 61, a rotation member 78 of synthetic resin is rotatably installed to the shaft 61*r* and two-stage gear 79 of synthetic resin is rotatably installed to the shaft 61*s*. A retainer plate 80 is mounted on the end of the shafts 61*r* and 61*s*. The retainer plate is indicated by a solid line in FIG. 23 and by a two-dot chain line in FIG. 24. That is, the retainer plate 80 is threadably mounted, by inserting a small diameter portion formed on the end of the shaft 61*a* into a small hole and inserting a screw in a large hole, on the screw hole formed at the end of the shaft 61*r* to prevent the rotation member 78 and the two-stage gear 79 from coming out from the shafts 61*r* and 61*s*.

The rotation member 78 forms the gear portion 78*a* on its perimeter surface and forms a mounting shaft 78*b* and a to-be-detected portion 78*c* (refer to FIG. 20) on the surface of the base plate 61 side. The mounting shaft 78*b* is rotatably fitted into a hole made at an end of a link member 81 that is made of synthetic resin. The mounting shaft 62*b* installed to the above described main operation member 62 is rotatably fitted into a hole made at an end of a link member 81. Therefore, when the rotation member 78 rotates, the main operation member 62 is rotated via the link member 81 in the opposite direction of the rotation member 62 and when the main operation member 62 rotates, the main operation member 63 is rotated via the link member 64 in the opposite direction of the main operation member 62. The gear portion 78a of the rotation member 78 engages with the smaller gear portion of the two-stage gear 79. Note that, in the present embodiment, the rotation member 78 is made of synthetic resin and forms the gear portion 78a. Since the gear portion 78a is positioned further away from the light path than the main operation member 62, the shape of the teeth of the gear portion 78a will possibly not be transformed by heat.

A rotation position detection device 82 is installed on the base plate 61. The rotation position detection device 82 of the present invention includes a photoelectric sensor that is called a photo interrupter having a light emitting portion and a light receiving portion, and a print circuit board on which the photoelectric sensor is installed. As shown in FIGS. 19, 20 and 22, the print circuit board is installed on the surface opposite to the light path by screws. In the installed state, the photoelectric sensor protrudes to the light path side. The above described to-be-detected portion 78c installed at the rotation member 78 is constructed to move in and out the space between the light emitting portion and the light receiving portion of the photoelectric sensor.

In addition the electromagnetic actuator that is the driving device of the present embodiment is a stepping motor 83 that is arranged on the light path side with the rotation shaft being perpendicular to the base plate 61 as shown in FIG. 23 and FIG. 24. Two mounting portions extruded in the radial direction is mounted to the base plate 61 by two screws. A gear 84 (refer to FIG. 20) installed to the output shaft of the stepping motor 83 engages with the larger gear portion of the above described two-stage gear 79.

When the thus-configured diaphragm apparatus of the present embodiment is built in the projector, the light source is often arranged in the lower left portion in FIGS. 19 and 20, in the front portion in FIG. 21, in the lower portion in FIG. 22, in the upper portion in FIGS. 23 and 24. However, depending on the specification of the projector, the light source may be configured to exist in the opposite side.

In addition, when the diaphragm apparatus of the present embodiment is built in the projector, lenses such as fly eye lenses and so on are usually arranged on the light source side of the four divided blades 69, 70, 71 and 72. Therefore, when the four divided blades 69, 70, 71 and 72 go into the light path, if the light reflected on the surface of the light source side of the blades is reflected at the lens and is included in the illumination light that is penetrated through the lens, illumination distribution may be affected negatively. In addition, if the light reflected on the surface of the light source side of the blades passes through the above described lens and advances toward the direction of the light path, the life of the light source may be affected negatively. However, in the present embodiment, since the four divided blades 69, 70, 71 and 72 are configured to be obliquely arranged with regard to the light path such that majority of light illuminated on the surface of the light source side of the blades is reflected to the side of the light path. There will be no bad influence.

Then, actuation of the present embodiment will be explained. FIGS. 19-24 show a state in which a minimum diaphragm aperture is controlled by the four divided blades 69, 70, 71 and 72. However, in the present embodiment, this state is acquired when the projector power source is turned off or nothing is projected while the power is on.

When the projection is started, the switch of the diaphragm apparatus is turned on and a predetermined light intensity control state (diaphragm aperture control state) is selected manually or automatically, and the stepping motor 83 is rotated, therefore, the gear 84 (refer to FIG. 20) installed to the output shaft of the stepping motor 83 in FIG. 24, rotates the two-stage gear 79 counterclockwise and rotates the rotation member 78 clockwise. Therefore, the main operation member 62 is rotated counterclockwise via the link member 81 and the main operation member 63 is rotated clockwise via the link member 64 installed between the main operation members 62 and 63.

Then, the main operation member 62 rotates the sub operation member 65 counterclockwise via the link member 67 and the main operation member 63 rotates the sub operation member 66 clockwise via the link member 68. Since the distances from the main shafts 61m and 61n to the mounting shafts 62d and 63c are shorter than the distances from the sub shafts 61p and 61q to the mounting shafts 65b and 66b, the rotation speeds of the sub operation members 65 and 66 are slower than the rotation speeds of the main operation members 62 and 63. Therefore, while the superposed area of the main divided blade 69 and the sub divided blade 71 is being increased, the main divided blade 69 and the sub divided blade 71 move along a circular track counterclockwise. While the superposed area of the main divided blade 70 and the sub divided blade 72 are being increased, the main divided blade 70 and the sub divided blade 72 move along a circular track counterclockwise.

In addition, in the present embodiment, since the distance from the main shaft 61m to the mounting shaft 62d is the same as the distance from the main shaft 61n to the mounting shaft 63c, and the distance from the sub shaft 61p to the mounting shaft 65b is the same as the distance from the sub shaft 61q to the mounting shaft 66b, and further the distance from the mounting shaft 62d to the mounting shaft 65b is the same as the distance from the mounting shaft 63c to the mounting shaft 66b, when the two main operation members 62 and 63 are configured to rotate in the opposite directions at substantially same speeds, the superposed area of the main divided blade 69 and the sub divided blade 71 and the superposed area of the main divided blade 70 and the sub divided blade 72 symmetrically vary.

Thus, when a predetermined light intensity control state is acquired, the rotation of the stepping motor 83 is stopped and projection is continued in the state. When illumination intensity is increased to a predetermined intensity during projection, the stepping motor 83 is rotated in the same direction as described above until desired intensity is acquired and when illumination intensity is decreased to a predetermined intensity during projection, the stepping motor 83 is rotated in the reverse direction until desired intensity is acquired. FIGS. 19-24 show a state in which the illumination intensity is thus decreased to a minimum value.

Figure 25:
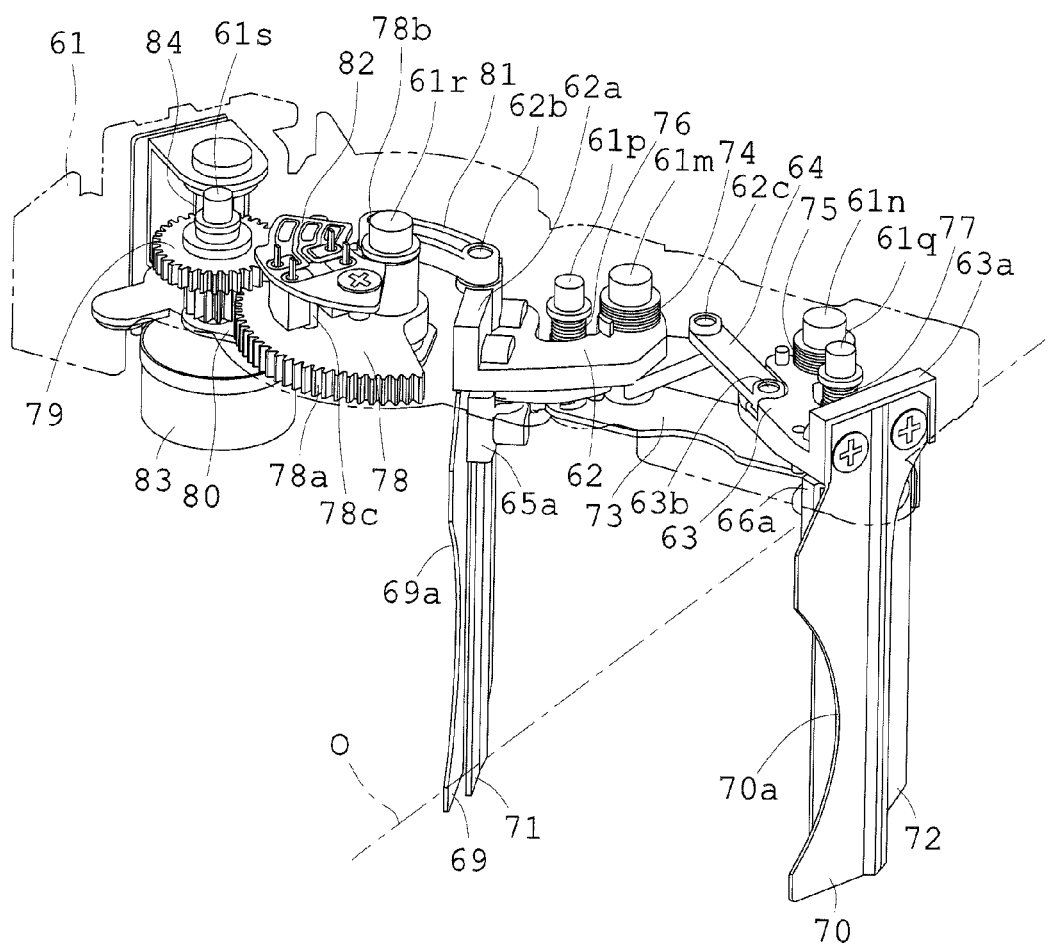
FIG. 25 is a perspective view of an embodiment showing a fully opened state of a light path by two sets of intercepting blades in the similar manner as FIG. 20.
Figure 26:
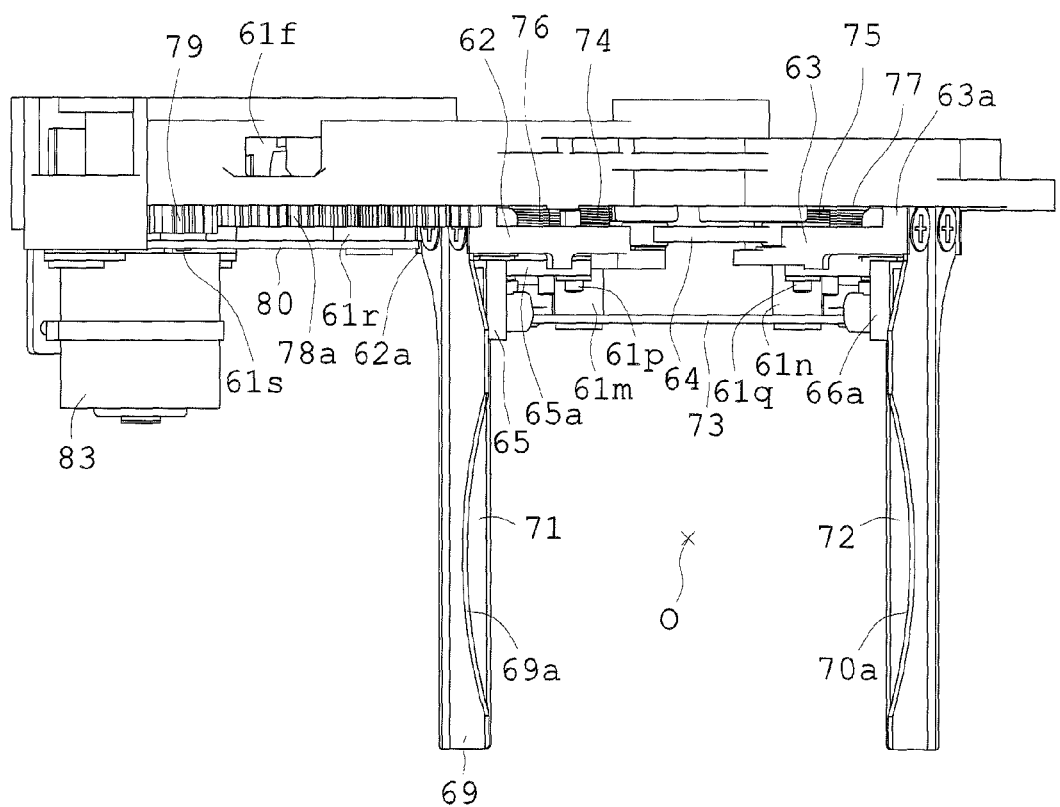
FIG. 26 is an elevation showing the same state as FIG. 25.
Figure 27:
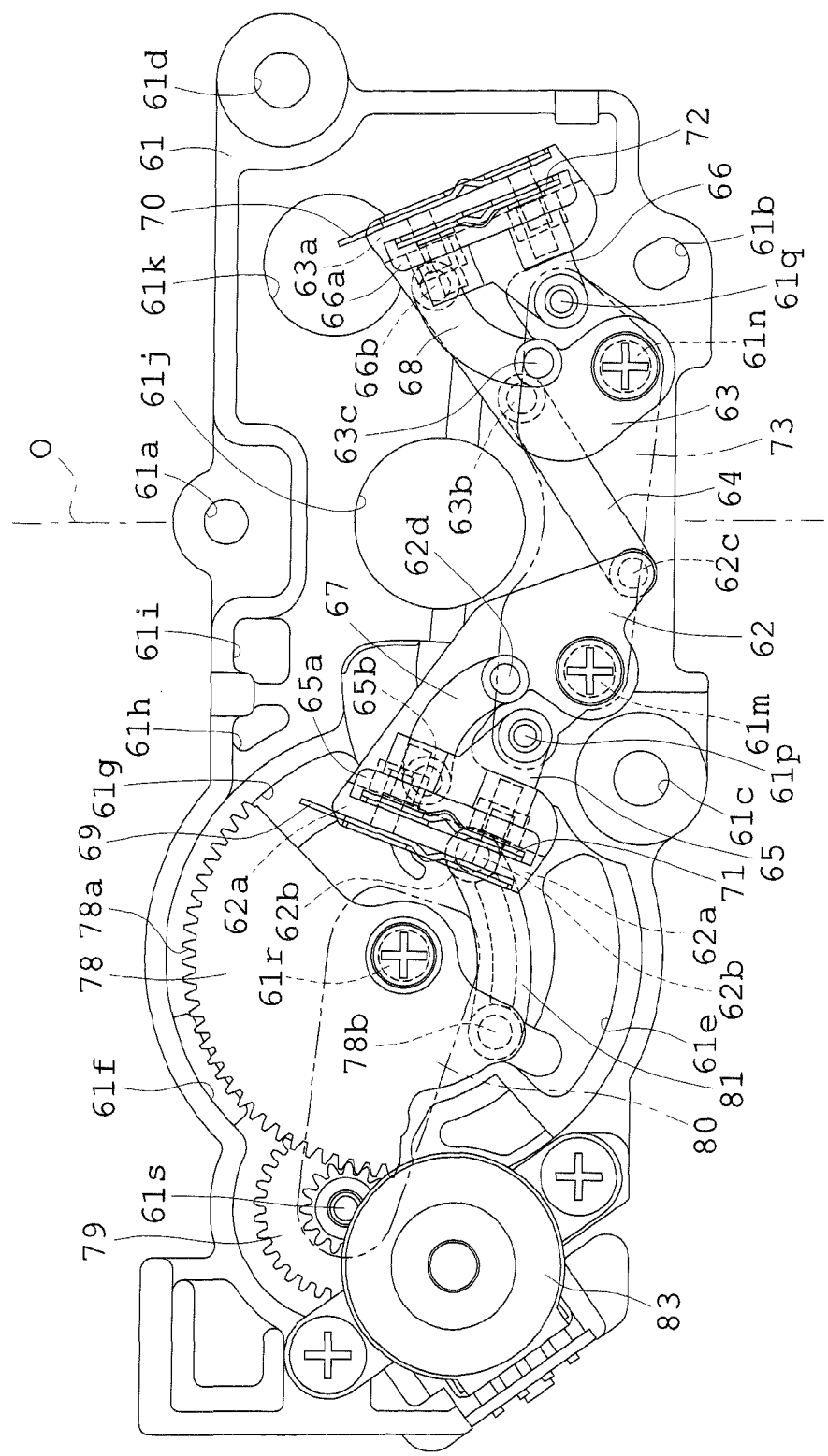
FIG. 27 is a bottom view showing the same state as FIG. 25 in the similar manner as FIG. 24.

FIGS. 25-27 show a state in which the illumination intensity is maximized in the same way as in FIGS. 20, 21 and 24. However, in the state, the main divided blades 69 and 70 do not function directly to determine the size of the light path and is stopped right after the light path is fully opened. In the present embodiment, as shown in FIG. 25, this state is acquired when the photoelectric sensor of the rotation position detection device 82 detects the position of the to-be-detected portion 78c that is installed at the rotation member 78 and the rotation of the stepping motor 83 is stopped.

Thus, when projection is completed and the switch for the diaphragm apparatus is turned off, the stepping motor 83 rotates during the delay circuit is working and the four divided blades 69, 70, 71 and 72 are returned to the state shown in FIGS. 19-24.

Note that, in the present embodiment, the main operation members 62 and 63, the sub operation members 65 and 66, link members 64, 67, 68 and 81 and the rotation member 78 are installed to the surface of the light path side. However in the present invention, those members may be mounted to the surface opposite to the light path of the base plate 61. The diaphragm apparatus of the present embodiment is configured to form a minimum diaphragm aperture as shown in FIGS. 19-21 by the cut portions 69*a* and 70*a*, without completely intercepting the light path by the four divided blades 69, 70, 71 and 72. However, in the present invention, the aperture forming edge may be configured to be linear to form a minimum diaphragm aperture having a long and narrow slit between the two main divided blades 69 and 70, without forming the cut portions 69*a* and 70*a* that have circular aperture forming edge on the main divided blades 69 and 70. As in the present embodiment, such a structure need not be capable of superposing a portion of the main divided blade 2 and a portion of the main divided blade 3.

The diaphragm apparatus of the present embodiment is configured such that two sets of light intercepting devices having a main operation member, a sub operation member, a link member, a main divided blade, and a sub divided blade are provided and the light intercepting means reciprocally move in the opposing directions by a single electromagnetic actuator. However, in the present invention, as the first embodiment, a set of light intercepting means may be configured so as to be reciprocally moved by an electromagnetic actuator by removing the two operation members 63 and 66, the two divided blades 70 and 72, and link members 64, 67, and 68. In that case, the cut portion 69*a* may not be formed on the main blade 69, and the minimum diaphragm aperture may be configured to be smaller and the light path may be configured to be completely intercepted by making the size of the main divided blade 69 larger, or by increasing the rotatable angle of the main operation member 62.

INDUSTRIAL APPLICABILITY

The diaphragm apparatus for projectors of the present invention is heavily utilized in various presentations and business operations. The device is available as light intensity controlled diaphragm apparatuses for a projector having a liquid crystal panel and a digital mirror device (DMD).

The invention claimed is:

1. A diaphragm apparatus for projectors comprising:
a base plate arranged on a lateral position of a light path of light from a light source with one surface facing toward the light path;
a main shaft vertically arranged on one of the surfaces of the base plate;
a sub shaft vertically arranged on the plane in which the main shaft is vertically arranged at a position off an imaginary line which passes through the vertically arranged position of the main shaft and parallel to the center line of the light path;
a main operation member rotatably installed to the main shaft;
a main divided blade integrated with the main operation member, the main divided blade moving along a circular track centered at the main shaft, and reciprocally moving in the light path;
a sub operation member rotatably installed to the sub shaft;
a sub divided blade integrated with the sub operation member, the sub divided blade moving along a circular track centered at the sub shaft, and reciprocally moving in the light path; and
a link member, a first end of which is rotatably installed to the main operation member and a second end of which is rotatably installed to the sub operation member, the distance from the sub shaft to the second end of the link member being longer than the distance from the main shaft to the first end of the link member;
wherein the main operation member and the sub operation member are configured to be rotated in the same direction by an electromagnetic actuator such that the superposed area of the main divided blade and the sub divided blade varies.

2. The diaphragm apparatus for projectors according to claim 1, wherein the main operation member has a gear portion that is engaged with a gear rotated by the electromagnetic actuator.

3. The diaphragm apparatus for projectors according to claim 1, further includes:
a rotation member that is rotatably mounted to the base plate and is reciprocally rotated within a predetermined angle coordinating with the rotation of the electromagnetic actuator; and
a link member, a first end of which is rotatably installed to the rotation member and a second end of which is rotatably installed to the main operation member, the main operation member being reciprocally rotated by the reciprocal rotation of the rotation member within a predetermined angle.

4. The diaphragm apparatus for projectors according to claim 1, wherein the main operation member and the sub operation member are made of synthetic resin, the main divided blade and the sub divided blade are made of metal and the main divided blade and the sub divided blade are secured respectively to the main operation member and the sub operation member.

5. The diaphragm apparatus for projectors according to claim 1, wherein the main shaft and the sub shaft are configured to be vertically arranged on the base plate not to lie on the same line that is at right angles to the light path.

6. The diaphragm apparatus for projectors according to claim 1, wherein the main divided blade and the sub divided blade is configured such that when the superposed area of the main divided blade and the sub divided blade is decreased to a minimum, the light path is intercepted by the divided blades.

7. A diaphragm apparatus for projectors comprising:
a base plate arranged on a lateral position of a light path of light from a light source with one surface facing toward the light path;
a first main shaft and a second main shaft vertically arranged on one of the surfaces of the base plate at positions that are substantially equally spaced from an imaginary line on both sides thereof which is parallel and closest to the center axis of the light path;
a first sub shaft and a second sub shaft vertically arranged at positions that are substantially equally spaced from the imaginary line on both sides thereof, the distances from the imaginary line to each of the sub shafts being longer than the distances from the imaginary line to each of the main shafts, the sub shafts being located on a plane in which the two main shafts are vertically arranged;
a first main operation member and a second main operation member rotatably installed to the first main shaft and the second main shaft respectively, the main operation members being reciprocally rotated simultaneously in the opposing directions by driving means;
a first main divided blade and a second main divided blade integrated with the first main operation member and the second main operation member respectively, the first main divided blade and the second main divided blade moving along a circular track centered at the first main shaft and the second main shaft and reciprocally moving in the light path;
a first sub operation member and a second sub operation member rotatably installed to the first sub shaft and the second sub shaft;
a first sub divided blade and a second sub divided blade integrated with the first sub operation member and the second sub operation member respectively, the first sub divided blade and the second sub divided blade moving along a circular track centered at the first sub shaft and the second sub shaft and reciprocally moving in the light path; and
a first link member and a second link member, first ends of the first and second link members being rotatably installed to the first main operation member and the second main operation member, and second ends of the first and second link members being rotatably installed to the first sub operation member and the second sub operation member, the distances from the first sub shaft and the second sub shaft to the second ends of the first and second link members being longer than the distances from the first main shaft and the second main shaft to each of the first ends of the first and second link members;
wherein the first sub operation member is configured to vary the superposed area of the first sub divided blade and the first main divided blade by being rotated in the same direction by the reciprocal rotation of the first main operation member, and the second sub operation member is configured to vary the superposed area of the second sub divided blade and the second main divided blade by being rotated in the same direction by the reciprocal rotation of the second main operation member.

8. The diaphragm apparatus for projectors according to claim 7, wherein the first main operation member, the first sub operation member, the second main operation member and the second sub operation member are made of synthetic resin, the first main divided blade, the first sub divided blade, the second main divided blade and the second sub divided blade are made of metal, and the first main divided blade, the first sub divided blade, the second main divided blade and the second sub divided blade are secured to the first main operation member, to the first sub operation member, to the second main operation member and to the second sub operation member respectively.

9. The diaphragm apparatus for projectors according to claim 7, wherein the first main shaft and the first sub shaft are vertically arranged on the base plate not to lie on the same line that is at right angles to the light path, the second main shaft and the second sub shaft are vertically arranged on the base plate not to lie on the same line that is at right angles to the light path, and the first sub shaft and the second sub shaft are vertically arranged at positions in the same direction along the light path with regard to the first main shaft and the second main shaft.

10. The diaphragm apparatus for projectors according to claim 9, wherein the distance on the first main operation member between the position to which the first main shaft is installed and the first main divided blade is the same as the distance on the second main operation member between the position to which the second main shaft is installed and the second main divided blade, and the distance on the first sub operation member between the position to which the first sub shaft is installed and the first sub divided blade is the same as the distance on the second sub operation member between the position to which the second sub shaft is installed and the second sub divided blade.

11. The diaphragm apparatus for projectors according to claim 7, wherein the distance on the first main operation member between the position to which the first main shaft is installed and the mounting position of the first link member is the same as the distance on the second main operation member between the position to which the second main shaft is installed and the mounting position of the second link member, the distance on the first sub operation member between the position to which the first sub shaft is installed and the mounting position of the first link member is the same as the distance on the second sub operation member between the position to which the second sub shaft is installed and the mounting position of the second link member, and further, the distance on the first link member between the position to which the first main operation member is installed and the mounting position of the first sub operation member is the same as the distance on the second link member between the position to which the second main operation member is installed and the mounting position of the second sub operation member.

12. The diaphragm apparatus for projectors according to claim 7, wherein a first gear portion is formed at the first main operation member, a second gear portion engaging with the first gear portion is formed at the second main operation member, the driving means is a single electromagnetic actuator, and when one of the first main operation member and the second main operation member is reciprocally rotated by the electromagnetic actuator, the two main operation members are rotated in the opposing directions.

13. The diaphragm apparatus for projectors according to claim 7, wherein a third link member is provided whose ends are rotatably installed to the first main operation member and the second main operation member, the driving means is a single electromagnetic actuator, and when one of the first main operation member and the second main operation member is reciprocally rotated by the electromagnetic actuator, the two main operation members are rotated in the opposing directions.

14. The diaphragm apparatus for projectors according to claim 13, wherein the distance on the first main operation member between the position to which the first main shaft is installed and the mounting position of the third link member is the same as the distance on the second main operation member between the position to which the second main shaft is installed and the mounting position of the third link member.

15. The diaphragm apparatus for projectors according to claim 7, wherein a gear portion engaged with a gear that is rotated by the electromagnetic actuator is formed on one of the first main operation member and the second main operation member.

16. The diaphragm apparatus for projectors according to claim 7, further includes:
a rotation member that is rotatably mounted to the base plate and is reciprocally rotated within a predetermined angle coordinating with the rotation of the electromagnetic actuator; and
a main link member, one end of which is rotatably installed to the rotation member and another end of which is rotatably installed to the first main operation member, and the first main operation member being reciprocally rotated by the reciprocal rotation of the rotation member.

17. The diaphragm apparatus for projectors according to claim 7, wherein the driving means are two electromagnetic actuators that are simultaneously reciprocally rotated in the opposing directions in synchronization with each other, and the first main operation member and the second main operation member are reciprocally rotated in the opposing directions simultaneously by the electromagnetic actuator.

18. The diaphragm apparatus for projectors according to claim 7, wherein the first sub divided blade and the second sub divided blade are configured such that areas having a predetermined width along the end edge in the direction retreating from the light path is not superposed with each of the main divided blades and the areas are formed by being bended to the sides of each of the main divided blades.

19. The diaphragm apparatus for projectors according to claim 7, wherein when the superposed area of the first main divided blade and the first sub divided blade are decreased to a minimum and the superposed area of the second main divided blade and the second sub divided blade are decreased to a minimum, the light path is intercepted by the four divided blades.

20. The diaphragm apparatus for projectors according to claim 7, wherein when the superposed area of the first main divided blade and the first sub divided blade are decreased to a minimum and the superposed area of the second main divided blade and the second sub divided blade are decreased to a minimum, a small light path surrounding the center of the light path is formed by the cut portion formed in the first main divided blade and the cut portion formed in the second main divided blade.

* * * * *